US012810617B2

(12) United States Patent
Matsumoto

(10) Patent No.: US 12,810,617 B2
(45) Date of Patent: Nov. 24, 2026

(54) DRONE MONITORING BASED ON DETECTED STATUS

(71) Applicant: Rakuten Group, Inc., Tokyo (JP)

(72) Inventor: Asaki Matsumoto, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 19/071,848

(22) Filed: Mar. 6, 2025

(65) Prior Publication Data

US 2025/0308241 A1 Oct. 2, 2025

(30) Foreign Application Priority Data

Mar. 26, 2024 (JP) ................................ 2024-049601

(51) Int. Cl.
*G08G 5/57* (2025.01)
*G06V 20/17* (2022.01)
*G06V 20/52* (2022.01)

(52) U.S. Cl.
CPC ............. *G06V 20/52* (2022.01); *G06V 20/17* (2022.01)

(58) Field of Classification Search
CPC ........ H04B 7/18506; G08G 5/26; G08G 5/57; G08G 5/56; G08G 5/727; G08G 5/54; G08G 5/23; G08G 1/0141
See application file for complete search history.

(56) References Cited

U.S. PATENT DOCUMENTS 11,341,859 B1 * 5/2022 Shepherd ................ G08G 5/55

FOREIGN PATENT DOCUMENTS

| | | | |
|---|---|---|---|
| JP | 2014-139795 | A | 7/2014 |
| JP | 2017-16633 | A | 1/2017 |
| JP | 2018-165931 | A | 10/2018 |
| JP | 2019-191676 | A | 10/2019 |
| JP | 2021-60407 | A | 4/2021 |
| JP | 2022-529507 | A | 6/2022 |
| JP | 2023-140524 | A | 10/2023 |
| WO | 2019/054027 | A1 | 3/2019 |

OTHER PUBLICATIONS

English Translation of Communication issued May 13, 2025 in Japanese Application No. 2024-049601.
Translation of Communication dated Aug. 26, 2025 in Japanese Application No. 2024-049601.

* cited by examiner

*Primary Examiner* — Kenneth J Malkowski
(74) *Attorney, Agent, or Firm* — Sughrue Mion, PLLC

(57) ABSTRACT

The management server MS identifies the drone status of each of the plurality of drones Dn for which the operator OPm is in charge, identifies, based on the identified each drone status, the drone Dn for which the monitoring required timing has arrived, and notifies the operator OPm of the monitoring information for the identified drone Dn by causing the monitoring information to be displayed on the drone monitoring screen.

19 Claims, 14 Drawing Sheets

DRONE MONITORING SCREEN

DRONE MONITORING SCREEN

FIG. 7

MONITORING PRIORITY MASTER TABLE EXAMPLE

| DRONE STATUS | MONITORING PRIORITY | MONITORING REQUIRED TIMING (CRITERIA) |
|---|---|---|
| ARRIVAL AT DESTINATION | 1 | WITHIN PERIOD FROM t6 BEFORE ARRIVAL AT DESTINATION TO t7 AFTER ARRIVAL AT DESTINATION |
| AFTER TAKE-OFF JUDGMENT | 2 | WITHIN PERIOD FROM TAKE-OFF START TIME UNTIL t4 LATER |
| ARRIVAL AT BASE | 3 | WITHIN PERIOD FROM t1 BEFORE ARRIVAL AT BASE TO t2 AFTER ARRIVAL AT BASE |
| TAKE-OFF | 4 | WITHIN PERIOD FROM AUTOMATIC TAKE-OFF START TIME UNTIL t5 LATER. |
| ... | ... | ..... |

DRONE MONITORING SCREEN

DRONE MONITORING BASED ON DETECTED STATUS

CROSS REFERENCE TO RELATED APPLICATION

This application claims priority from Japanese Patent Application No. 2024-49601 which was filed on Mar. 26, 2024, the disclosure of which is herein incorporated by reference in its entirety.

TECHNICAL FIELD

One or more embodiments of the present invention relate to a technical field of a system in which an operator can monitor a plurality of unmanned aerial vehicles.

RELATED ART

Conventionally, a system in which an operator can monitor and operate the plurality of unmanned aerial vehicles is known. For example, JP 2022-529507 A discloses a system in which at least one operator can monitor each UAV using a computing device capable of communicating with each of a plurality of UAVs (Unmanned Aerial Vehicles) and operate the take-off, ascent, descent, landing, etc. of the UAV. In JP 2022-529507 A, it is described that an example in which 10 operators monitor 500 UAVs.

However, when at least one operator monitors the plurality of unmanned aerial vehicles during the same period, there is a concern that the burden on the operator will increase and human error will occur.

Therefore, one or more embodiments of the present invention are to providing an information processing device, an information display method, and a non-transitory computer readable memory which are capable of preventing human error caused by the operator in a case where the operator monitors the plurality of unmanned aerial vehicles during the same period.

SUMMARY (An aspect 1) In response to the above issue, an information processing device includes: at least one memory configured to store program code; and at least one processor configured to access the program code and operate as instructed by the program code. The program code includes: first identification code configured to cause the at least one processor to identify a status of each of a plurality of unmanned aerial vehicles for which the operator is in charge; second identification code configured to cause the at least one processor to identify, based on the status of each of the plurality of the unmanned aerial vehicles, the unmanned aerial vehicle for which a monitoring required timing has arrived among the plurality of the unmanned aerial vehicles, the monitoring required timing being a timing required for operator to monitor the unmanned aerial vehicle; and processing code configured to cause the at least one processor to notify the operator, via a terminal used by the operator, of monitoring information for the identified unmanned aerial vehicle, the monitoring information including information that prompts the operator to monitor the identified unmanned aerial vehicle.

(An aspect 2) An information display method executed by one or more computers, includes: identifying a status of each of a plurality of unmanned aerial vehicles for which the operator is in charge; identifying, based on the status of each of the plurality of the unmanned aerial vehicles, the unmanned aerial vehicle for which a monitoring required timing has arrived among the plurality of the unmanned aerial vehicles, the monitoring required timing being a timing required for operator to monitor the unmanned aerial vehicle; and notifying the operator, via a terminal used by the operator, of monitoring information for the identified unmanned aerial vehicle, the monitoring information including information that prompts the operator to monitor the unmanned aerial vehicle.

(An aspect 3) A non-transitory computer readable memory has stored thereon a program configured to cause a computer to: acquire, from a predetermined server, a status of each of a plurality of unmanned aerial vehicles for which the operator is in charge; identify, based on the status of each of the plurality of the unmanned aerial vehicles, the unmanned aerial vehicle for which a monitoring required timing has arrived among the plurality of the unmanned aerial vehicles, the monitoring required timing being a timing required for operator to monitor the unmanned aerial vehicle; and notify the operator, via a terminal used by the operator, of monitoring information for the identified unmanned aerial vehicle, the monitoring information including information that prompts the operator to monitor the unmanned aerial vehicle.

BRIEF DESCRIPTION OF THE DRAWINGS

FIG. 7 is a diagram illustrating an example of a monitoring priority master table.

DETAILED DESCRIPTION

Hereinbelow, one or more embodiments of the present invention will be described with reference to the drawings. The following embodiment is an embodiment in a case where the present invention is applied to a remote monitoring system capable of remotely monitoring drones. Incidentally, in the above embodiment, the drone has been described as an example of the unmanned aerial vehicle, but the present invention is also applicable to a flying robot and the like as examples of the unmanned aerial vehicle.

[1. Configuration and Operation Outline of Remote Monitoring System S]

Figure 1:
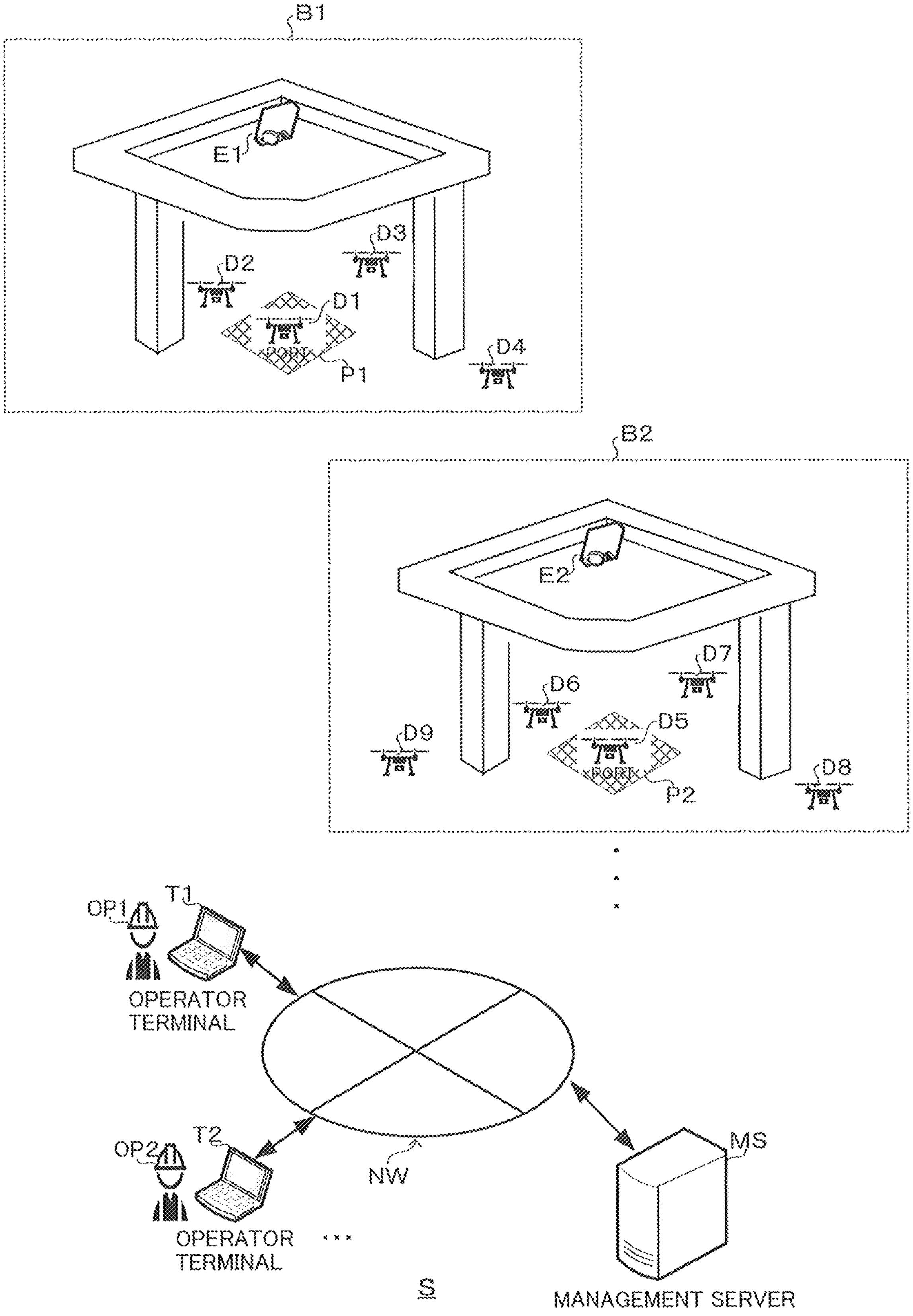
FIG. 1 is a diagram illustrating a schematic configuration example of a remote monitoring system S.

First, a description will be given as to a configuration and an operation outline of a remote monitoring system S according to the present embodiment with reference to FIG. 1. FIG. 1 is a diagram illustrating a schematic configuration example of the remote monitoring system S. As illustrated in FIG. 1, the remote monitoring system S includes a plurality of drones Dn (n=1, 2, 3, . . . ), a plurality of operator terminals Tm (m=1, 2, . . . ), and a management server MS (an example of an information processing device and a predetermined server). The drone Dn, the operator terminal Tm, and the management server MS are each connected to a communication network NW. The communication network NW includes, for example, the Internet, a mobile communication network, a radio base station thereof, and the like.

The drone Dn is an example of an unmanned flying object, and is also referred to as a multicopter, or an UAV (Unmanned Aerial Vehicle). The drone Dn is capable of taking off according to take-off instructions from a GCS (Ground Control Station) and flying autonomously. The drone Dn is used for, for example, delivery, surveying, photographing, monitoring, and the like. The GCS is installed as an application in the operator terminal Tm, for example, and is configured to be cooperated with the management server MS. Incidentally, the drone Dn can also fly according to remote control from the ground by a manipulator terminal (installing the GCS) used by a manipulator (drone pilot).

The drone Dn is under the control (in other words, jurisdiction) of any one of a plurality of drone bases Bm (in other words, the drone Dn belongs to any drone base Bm). The drone base Bm is a base (e.g., a facility) where the drone Dn is allowed to take off or land. In the example of FIG. 1, each of the drones D1 to D4 is under the control of the drone base B1, departs (takes off) from the drone base B1, and returns (lands) to the drone base B1. Moreover, each of the drones D5 to D9 is under the control of the drone base B2, departs from the drone base B2, and returns to the drone base B2. However, one drone Dn may be under the control of the plurality of the drone bases Bm. For example, the drone D11 (not shown) may depart from the drone base B2 and return to the drone base B1. Incidentally, the number of drones Dn under the control of one drone base Bm is not particularly limited.

Moreover, in the drone base Bm, a port Pm used for a take-off and landing of drone Dn and a base instrument Em (an example of an instrument, a device, or an equipment) used for monitoring drone Dn are installed. At the drone base Bm, a base staff manually performs a pre-flight inspection (e.g., checking vehicle state or condition) of the drone Dn (hereinafter, the inspection is referred to as “manual inspection”). For example, the base staff visually inspects a predetermined portion of the drone Dn for each inspection item of the manual inspection, or inspects the predetermined portion of the drone Dn by touching it. Then, manual inspection result information (an example of base information) indicating the result of the manual inspection by the base staff is transmitted to the management server MS via the communication network NW from a terminal (an example of an instrument) such as a smartphone of the base staff. Moreover, the drone Dn, which has completed the pre-flight inspection, is placed at the port Pm and takes off (departs) from the port Pm according to a predetermined drone schedule. Moreover, the drone Dn that has returned to the drone base Bm lands at the port Pm. Incidentally, a plurality of ports Pm may be installed at one drone base Bm.

The base instrument Em is connected to the communication network NW, is equipped with a base camera (e.g., an RGB camera or an infrared camera) for monitoring the drone Dn. The base instrument Em stores a base ID (identification information) for identifying the drone base Bm. The base camera (an example of a second camera) is configured to sequentially (continuously) capture (image) drone Dn placed, for example, at the port Pm. Base image information (an example of base information) representing base images (an example of second images, e.g., still images or moving images) captured by the base camera is transmitted from the base instrument Em to the management server MS together with the base ID. Incidentally, a plurality of base instruments Em may be installed at one drone base Bm. Moreover, the base instrument Em may be provided with a wind sensor that detects (measures) at least one of wind speed and wind direction. Measurement information (an example of base information) measured by the wind sensor is transmitted from the base instrument Em to the management server MS. Furthermore, the base instrument Em may be provided with at least one of a temperature sensor, a humidity sensor, a rainfall (snow) amount sensor, and an air pressure sensor (aerotonometer). Measurement information (an example of base information) measured by these sensors is transmitted from the base instrument Em to the management server MS.

The operator terminal Tm is a terminal used by an operator OPm who remotely monitors the plurality of the drones Dn. The operator OPm monitors the plurality of the drones Dn for which he/she is in charge while looking at information displayed on a screen (a user interface screen) of the operator terminal Tm. Such monitoring includes, for example, at least one of (i) checking the status of the pre-flight inspection of each of the plurality of the drones Dn, (ii) monitoring the condition of each of the plurality of the drones Dn before flight, (iii) monitoring the condition of each of the plurality of the drones Dn in flight. Moreover, the monitoring may include actions that involve monitoring (e.g., operations of operator OPm). For example, while the drone Dn is in operation, there is a timing that requires monitoring of the drone Dn, and such timing is referred to as a monitoring required timing (in other words, gaze required timing). Although the monitoring required timing may be a time point (in other words, a point in time), it is desirable to have a time length (time width) because monitoring requires a certain amount of time. Therefore, the monitoring required timing can be called monitoring time required. The monitoring required timing is registered (set) for each status (hereinafter referred to as “drone status”) that requires monitoring among a plurality of statuses of the drone Dn. Therefore, there are a plurality of the monitoring required timings. Examples of the drone statuses that requires monitoring include "ARRIVAL AT BASE (drone base)", "BEFORE TAKE-OFF JUDGMENT (take-off clearance)", "AFTER TAKE-OFF JUDGMENT", "TAKE-OFF SCHEDULED", "TAKE-OFF DECIDED", "TAKE-OFF (automatic take-off)", "ARRIVAL AT DESTINATION", and the like.

For example, in the case of the "ARRIVAL AT BASE", the monitoring required timing is set within the period from t1 minutes before the drone Dn arrives at the drone base Bm to t2 minutes after the drone Dn arrives at the drone base Bm. In the case of the "BEFORE TAKE-OFF JUDGMENT", the monitoring required timing is set within the period from t3 minutes before the operator OPm makes a take-off judgment to the time when the operator OPm makes the take-off judgment. Here, the take-off judgment is made by, for example, a take-off judgment button displayed on the screen of the operator terminal Tm being pressed. In the case of the "AFTER TAKE-OFF JUDGMENT", the monitoring required timing is set within the period from the time when the drone Dn starts to take off until t4 minutes later. Here, the drone Dn starts to take off, for example, in response to that the operator OPm makes the take-off judgment (e.g., presses the take-off judgment button). In the case of the "TAKE-OFF", the monitoring required timing is set within the period from the time when the drone Dn automatically starts to take off from the drone base Bm at a scheduled time until t5 minutes later. In the case of the "ARRIVAL AT DESTINATION", the monitoring required timing is set within the period from t6 minutes before the drone Dn arrives at the destination to t7 minutes after the drone Dn arrives at the destination. Above t1 to t7 may be the same or different from each other, and may be set to about 1 to 5 minutes, for example. Incidentally, in a case where the drone Dn is used for delivery, the destination is a delivery destination of an article. Another example of the drone status that requires monitoring is "ABNORMAL OCCURRENCE".

In the present embodiment, the monitoring means, for example, that the operator OPm gazes at (carefully looks at) a specific portion on the screen through vision. Here, the specific portion includes a portion that requires the operator's gazing (attention). In other words, the specific portion includes a portion on the screen at which the operator OPm is requested to gaze. When the monitoring required timing has arrived (in other words, the current time comes a starting point of the monitoring required timing), monitoring information including information (for example, the drone name) of the drone Dn for which the monitoring required timing has arrived, is notified to the operator OPm via the operator terminal Tm from the management server MS. The monitoring information for the drone Dn is also information that prompts the operator OPm to monitor the drone Dn for which the monitoring required timing has arrived. The monitoring information includes, for example, at least one of vehicle information acquired by the drone Dn and base information acquired by the base instruments Em. For example, the monitoring information may be notified to the operator OPm by being displayed on the screen of the operator terminal Tm. Incidentally, the monitoring information may be notified to the operator OPm by being output as voice from the operator terminal Tm (speaker).

The management server MS is composed of one or a plurality of server computers that manages information on the drone base Bm for each drone base Bm. The information relating to the drone base Bm includes, for example, information on the drone Dn under the control of the drone base Bm, information on the operator OPm who monitors the drone Dn, and information on the operator terminal Tm used by the operator OPm. The management server MS identifies the plurality of the drones Dn for which the logged-in (by operating the operator terminal Tm) operator OPm is in charge, and controls to displays a list (hereinafter referred to as "drone list") showing the identified plurality of the drones Dn on the operator terminal Tm of the operator OPm. In the display state of such drone list, when the monitoring required timing that requires monitoring of any drone Dn among the plurality of the drones Dn arrives, the management server MS can cause the operator terminal Tm to automatically display the monitoring information for the drone Dn for which the monitoring required timing has arrived. Incidentally, the management server MS regularly or irregularly receives weather detailed information at the drone base Bm from a weather management server (not shown) via the communication network NW. The weather detailed information indicates the details of the weather.

[1-1. Configuration and Function of Drone Dn]

Figure 2:
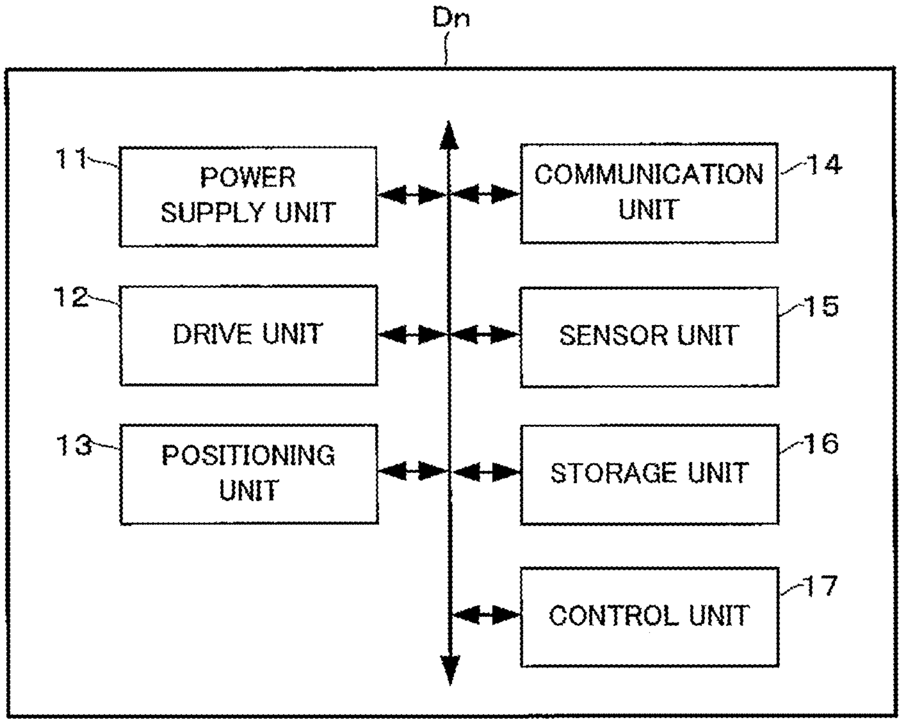
FIG. 2 is a diagram illustrating a schematic configuration example of a drone Dn.

Next, a configuration and a function of the drone Dn will be described with reference to FIG. 2. FIG. 2 is a diagram illustrating a schematic configuration example of the drone Dn. As illustrated in FIG. 2, the drone Dn includes a power supply unit 11, a drive unit 12, a positioning unit 13, a communication unit 14, a sensor unit 15, a storage unit 16, a control unit 17, and the like. Furthermore, the drone Dn includes a propeller (a rotor), which is a horizontal rotary wing, an arm pipe (including an arm joint) for attaching the propeller to a drone main body (a housing), and the like. Incidentally, in a case where the drone Dn is used for delivery of an article, the drone Dn includes a holding mechanism or the like for holding the article.

The power supply unit 11 includes a detachable battery (an electric storage device) and the like. The power supply unit 11 supplies (supplies electricity) power stored in the battery to each unit of the drone Dn. Moreover, the power supply unit 11 sequentially measures a remaining battery capacity. Battery information indicating the remaining battery capacity measured by the power supply unit 11 is output to the control unit 17. The drive unit 12 includes a motor, a rotation shaft, and the like. The drive unit 12 rotates the plurality of rotors by a motor, a rotation shaft, and the like that are driven in accordance with a control signal output from the control unit 17.

The positioning unit 13 includes a radio wave receiver, an altitude sensor, and the like. The positioning unit 13 receives, for example, a radio wave transmitted from positioning satellites of a GNSS (Global Navigation Satellite System) such as a GPS (Global Positioning System) by a radio wave receiver, and sequentially detects, on the basis of the radio wave, a current position of the drone Dn. The current position of the drone Dn may be expressed by the latitude and longitude of the drone Dn, or by the latitude, longitude, and altitude of the drone Dn. Here, the positioning satellites may include satellites used by a plurality of satellite positioning systems, such as GPS (Global Positioning System) satellites, Michibiki (QZSS: Quasi-Zenith Satellite System) satellites, and Galileo satellites. Position information indicating the current position detected by the positioning unit 13 is sequentially output to the control unit 17. At this time, capture number information indicating the capture number (satellite capture number) of positioning satellites captured by the positioning unit 13 is sequentially output to the control unit 17. Incidentally, the positioning unit 13 may detect the altitude of the drone Dn by the altitude sensor. In this case, the position information indicating the current position of the drone Dn includes altitude information indicating the altitude detected by the altitude sensor. The communication unit 14 has an antenna and a wireless communication function, and is responsible for controlling communication performed via the communication network NW.

The sensor unit 15 includes various sensors used to control the drone Dn. Examples of the various sensors include a compass (a geomagnetic sensor), a gyro (a triaxial angular speed sensor), a triaxial acceleration sensor, an atmospheric pressure sensor, a gimbal, an optical sensor, a range finder (a distance meter), and the like. The optical sensor includes a vehicle (aircraft) camera (for example, an RGB camera and an IR (Infrared ray) camera) and the like. The vehicle camera (an example of a first camera) is configured, for example, to sequentially capture images of the surroundings of the drone Dn (for example, in front of or below the drone Dn). Incidentally, the direction of the vehicle camera (e.g., forward or downward of the drone Dn) can be controlled by the control unit 17. Sensing information sensed by the sensor unit 15 is output to the control unit 17. The storage unit 16 includes a nonvolatile memory or the like, and stores various programs and data. Moreover, the storage unit 16 stores a vehicle ID (identification information) for identifying the drone Dn.

The control unit 17 includes at least one CPU (Central Processing Unit), an ROM (Read Only Memory), an RAM (Random Access Memory), and the like, and controls the drone Dn on the basis of the position information from the positioning unit 13 and the sensing information from the sensor unit 15. Such control includes control of a rotation speed of a propeller, control of a position, a posture, and a traveling direction of the drone Dn, and the like. The position information (i.e., the position information from the positioning unit 13) of the drone Dn, vehicle image information (an example of vehicle information) representing vehicle images (still images or moving images (video)) captured by the vehicle camera, the battery information (an example of vehicle information) from the power supply unit 11, and the capture number information (an example of vehicle information) from the positioning unit 13 are transmitted to the management server MS via the communication network NW together with the vehicle ID of the drone Dn.

Moreover, the control unit 17 has a self-diagnosis function, and performs an automatic inspection for each inspection item on whether a predetermined portion (for example, the power supply unit 11, the drive unit 12, the positioning unit 13, the communication unit 14, the sensor unit 15, or the like) of the drone Dn normally operates. The inspection items of the automatic inspection include, for example, the remaining battery capacity, a battery cell balance, the GPS, the compass, the gyro, the acceleration sensor, the air pressure sensor (atmospheric pressure sensor), the gimbal, the optical sensor, the range finder, and the like. Automatic inspection result information indicating results of the automatic inspection by the drone Dn (i.e., the control unit 17) is transmitted to the management server MS via the communication network NW. Incidentally, the automatic inspection by the drone Dn is performed before the drone Dn flies, but some inspection items of the automatic inspection are also performed during the drone Dn flies.

[1-2. Configuration and Function of Operator Terminal Tm]

Figure 3:
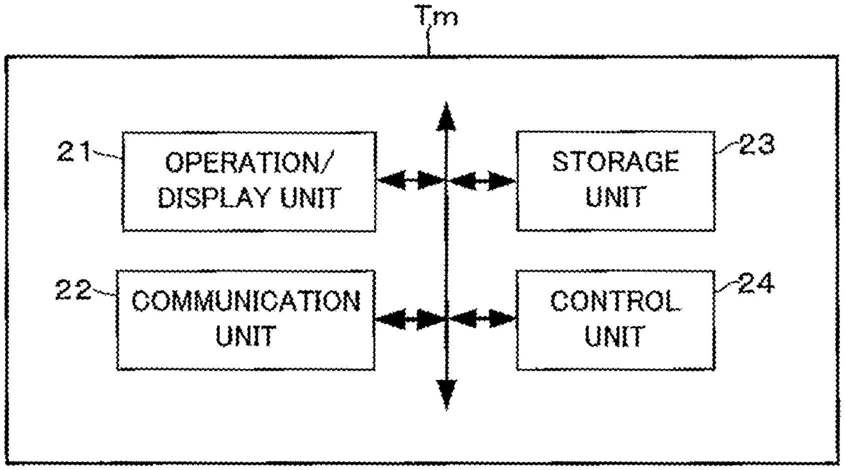
FIG. 3 is a diagram illustrating a schematic configuration example of an operator terminal Tm.

Next, a configuration and a function of the operator terminal Tm will be described with reference to FIG. 3. FIG. 3 is a diagram illustrating a schematic configuration example of the operator terminal Tm. The operator terminal Tm includes an operation/display unit 21, a communication unit 22, a storage unit 23, a control unit 24, and the like. As the operator terminal Tm, for example, a personal computer can be applied. The operator terminal Tm may include a voice processing unit and a speaker. The operation/display unit 21 has, for example, an input function for accepting input (selection) by a finger, pen, or mouse of the operator OPm, and a display function for displaying various screens on a display. Incidentally, the operator terminal Tm may be provided with a plurality of displays. The various screens include a login screen for the operator OPm to log in, a drone monitoring screen for the operator OPm to monitor the drone Dn, and an action request notification screen for notifying the operator OPm of a request for a predetermined action. Moreover, the drone monitoring screen and the action request notification screen should be displayed on separate displays at the same time.

The communication unit 22 controls communication performed via the communication network NW. The storage unit 23 includes a non-volatile memory or the like, and stores various programs (program code groups) and pieces of data. The various programs include an operating system (OS), a monitoring application, the GCS, and a web browser. The monitoring application is mainly a program for acquiring, from the management server MS, and displaying information regarding the plurality of the drones Dn for which the operator OPm is in charge. Incidentally, the monitoring application may be downloaded from a predetermined server to the operator terminal Tm.

The control unit 24 (an example of a computer) includes at least one CPU, a ROM, an RAM, and the like, and executes processing according to the monitoring application stored in the ROM (or, the storage unit 23). When the monitoring application is activated in response to an instruction of the operator OPm, the control unit 24 displays the login screen on the display. Then, when a user ID and a password are input by the operator OPm through the login screen, the control unit 24 transmits a login request including the user ID and the password to the management server MS via the communication unit 22 and the communication network NW. The user ID is identification information for identifying the operator OPm.

Then, when a login process is performed by the management server MS in response to the login request and the operator OPm logs in, display control data for displaying the drone list is transmitted from the management server MS, wherein the drone list indicates the plurality of the drones Dn for which the logged-in operator OPm is in charge. Thereby, the control unit 24 displays the drone monitoring screen including the drone list on the display. Incidentally, in the login processing, it is determined whether a set of the user ID and the password included in the login request is registered in a database. Then, when the set of the user ID and the password is registered, the operator OPm who uses the operator terminal Tm that has transmitted the login request is identified (identified by the user ID), and the operator OPm logs in.

Here, the plurality of the drones Dn indicated in the drone list may be under the control of the same drone base Bm, or may be under the control of different drone bases Bm. In the latter case, the drone list indicates the drones Dn (e.g., the drones D1 to D4 and drones D5 to D9) belonging to each of the plurality of the drone bases Bm (e.g., the drone base B1 and drone base B2). This allows the operator OPm to monitor each drone Dn under the control of the plurality of the drone bases Bm. Incidentally, the display control data may be data of a web page displayed by the web browser. The display control data of the drone monitoring screen may be incorporated into the monitoring application.

Figure 4:
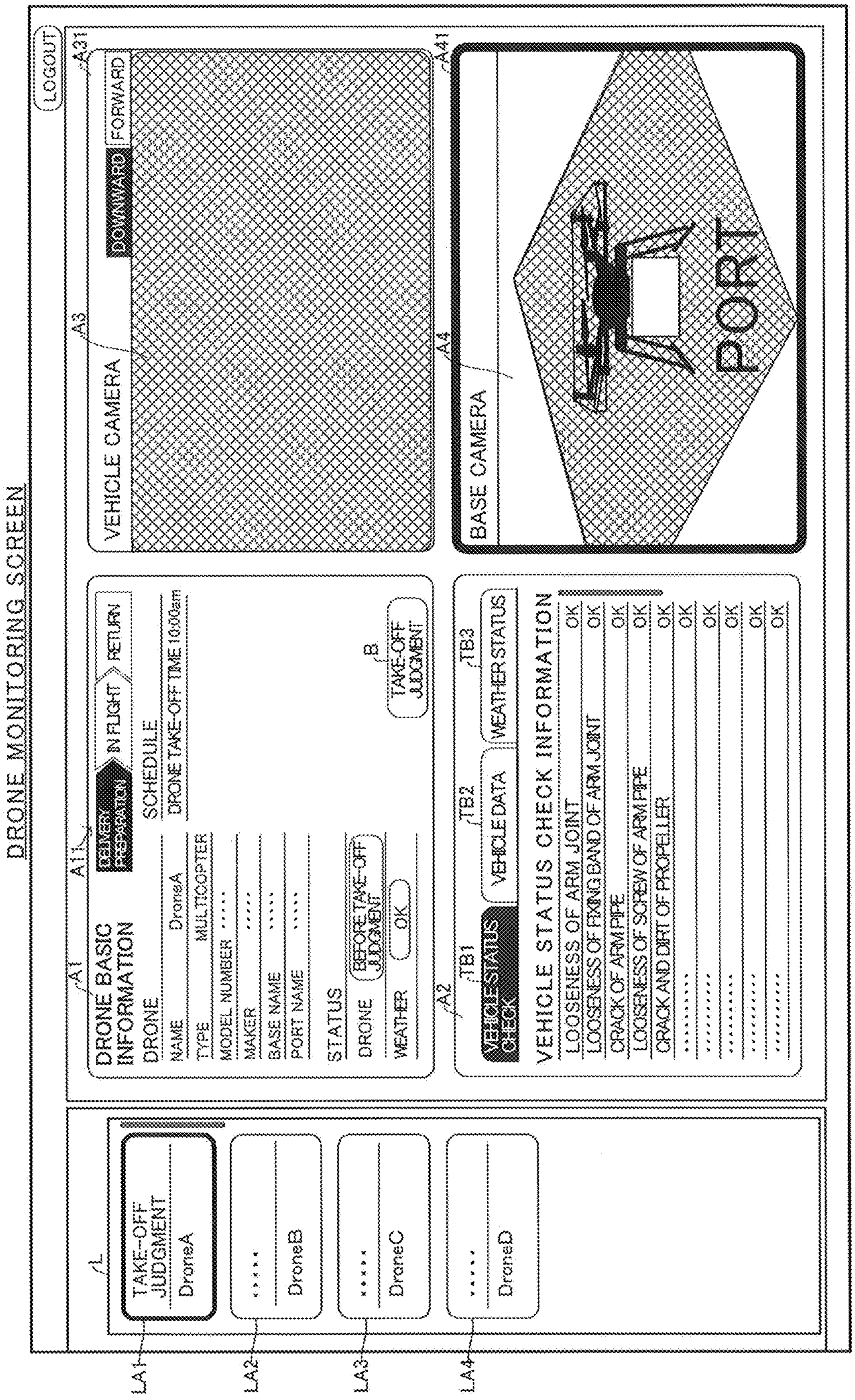
FIG. 4 is a diagram illustrating a display example (1) of a drone monitoring screen displayed on an operator terminal T1 of an operator OP1.
Figure 5:
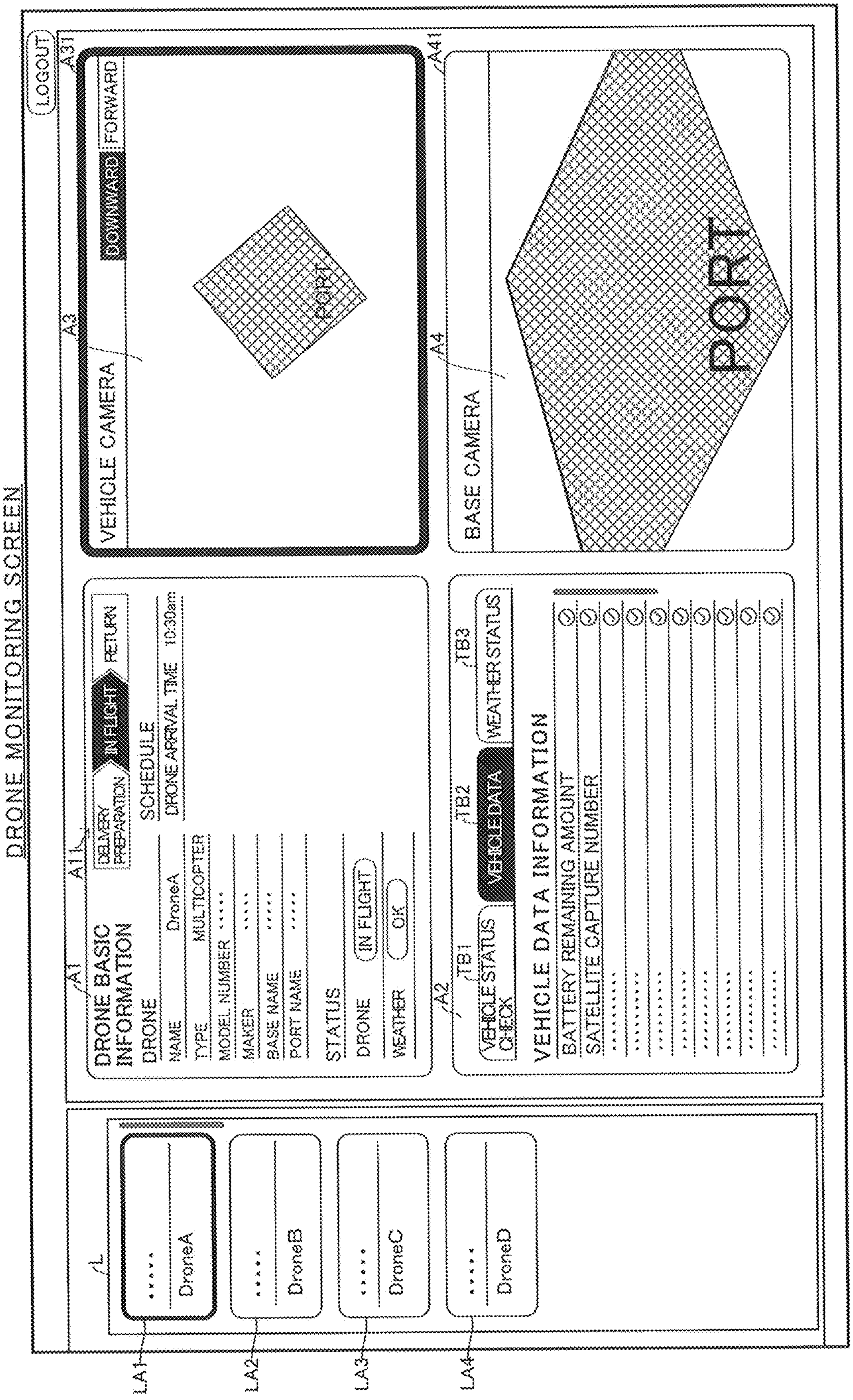
FIG. 5 is a diagram illustrating a display example (2) of a drone monitoring screen displayed on an operator terminal T1 of an operator OP1.

FIGS. 4 and 5 are a diagram illustrating a display example of the drone monitoring screen displayed on the operator terminal T1 of the operator OP1. As illustrated in FIGS. 4 and 5, a drone list L indicating (showing) the plurality of the drones D1 to D4 (the drone names: Drone A, Drone B, Drone C, Drone D) are displayed on the drone monitoring screen. Furthermore, a drone basic information display area A1, a drone detailed information display area A2, a vehicle camera display area A3, and a base camera display area A4 and the like are provided on the drone monitoring screen. The drone list L includes simple information display areas LA1 to LA4 corresponding to each of the drones D1 to D4 for which the operator OP1 is in charge. The simple information display areas LA1 to LA4 are scrollable. The names (the drone names) of the drones D1 to D4 are displayed on the simple information display areas LA1 to LA4. Incidentally, the drone list L may include simple information display areas corresponding to each of the drones D5 to D9 for which the operator OP1 is in charge.

Moreover, the simple information display areas LA1 to LA4 are selectable by the operator OP1. In other words, the drones D1 to D4 can be selected via the simple information display areas LA1 to LA4. In the display examples of FIGS. 4 and 5, since the drone D1 is in the selected state in response to selecting (pressing) of the simple information display area LA1 by the operator OP1, monitoring information (acquired from the management server MS as appropriate) for monitoring the drone D1 in the selected state is displayed in the drone basic information display area A1, the drone detailed information display area A2, the vehicle camera display area A3, and the base camera display area A4. Here, the monitoring information includes, for example, the manual inspection result information, the base image information, vehicle data information, the vehicle image information, the weather detailed information, and the like. Incidentally, in the display example of FIG. 4, the drone D1 is placed in the port P1 for take-off at the drone base B1 and is in a state where it is waiting for the take-off judgment (take-off clearance) by the operator OP1. On the other hand, in the display example of FIG. 5, the drone D1 is in a state of flying (rising) above the port P1.

The basic information of the drone D1, a drone status of the drone D1, a drone phase of the drone D1, a drone schedule of the drone D1, a weather status of the drone base B1, and a take-off judgment button B are displayed in the drone basic information display area A1. The take-off judgment button B is an operation button for accepting a take-off judgment (take-off clearance) for the drone D1 from the operator OP1. Incidentally, the measurement information measured by the sensor provided with the base instrument Em may be displayed in the drone basic information display area A1. In the display example of FIGS. 4 and 5, the basic information of the drone D1 includes, for example, drone name (i.e., name of the drone D1), type, model number, manufacturer (maker), base name (i.e., name of the drone base B1), and port name (name of port P1) of the drone D1, but is not particularly limited. The drone status of the drone D1 indicates what kind of state (situation) the drone D1 is currently. In the display example of FIG. 4, the drone status of the drone D1 is "BEFORE TAKE-OFF JUDGMENT", while in the display example of FIG. 5, the drone status of the drone D1 is "TAKE-OFF".

The drone phase of drone D1 roughly indicates what kind of phase the drone D1 is. In the display examples of FIGS. 4 and 5, "DELIVERY PREPARATION", "IN FLIGHT", and "RETURN" are displayed, as the drone phase of the drone D1, in a phase display portion A11. Then, in the phase display portion A11 of FIG. 4, "DELIVERY PREPARATION" is displayed. On the other hand, in the phase display portion A11 of FIG. 5, "IN FLIGHT" is displayed. The display contents of the phase display portion A11 are changed (switched) according to changing (switching) of the drone phase of the drone D1. The weather status indicates the current state (situation) of the weather at the drone base B1 based on the weather detailed information. The drone schedule of the drone D1 includes, for example, a scheduled time of at least one of arrival at base, take-off, and arrival at destination.

In the display example of FIG. 4, a vehicle status check tab TB1, a vehicle data tab TB2, and a weather status tab TB3 are provided in the drone detailed information display area A2. In this example, the vehicle status check tab TB1 is selected and displayed among the tabs TB1 to TB3, and therefore the vehicle status check information (list) is displayed below the tabs TB1 to TB3. Incidentally, the vehicle status check information is based on the manual inspection result information described above. In the display example of FIG. 4, "OK" as displayed in association with the inspection item "LOOSENESS OF ARM JOINT", which is included in the vehicle status check information, indicates for example, that the result of this manual inspection (vehicle status check) is fine (good). Incidentally, if the result of this manual inspection is not fine (i.e., defective), it will be associated with the inspection item, for example, "NG" will be displayed.

On the other hand, in the display example of FIG. 5, the vehicle data tab TB2 is selected and displayed among the tabs TB1 to TB3, and therefore the vehicle data information (list) is displayed below the tabs TB1 to TB3. The vehicle data information is based on the battery information (battery remaining amount) and the capture number information (satellite capture number). A check mark as displayed in association with the item "BATTERY REMAINING AMOUNT", which is included in the vehicle data information, indicates, for example, that the battery remaining amount is fine (good). The tabs TB1 to TB3 can be manually selected by the operator OP1, respectively. Moreover, the tabs TB1 to TB3 can be automatically changed (switched) depending on the drone status or the drone phase of the drone D1, respectively. Incidentally, when the weather status tab TB3 is selected, the weather detailed information of the drone base B1 is displayed below the tabs TB1 to TB3.

In the display example of FIG. 4, the moving image (hereinafter referred to as "vehicle camera video") captured by the vehicle camera of the drone D1 is displayed in the vehicle camera display area A3. On the other hand, the moving image (hereinafter referred to as "base camera video") captured by the base camera of the base instrument E1 is displayed in the base camera display area A4. In the display example of FIG. 4, the drone status of the drone D1 is "BEFORE TAKE-OFF JUDGMENT", and therefore the base camera video is highlighted. For example, the frame A41 of the base camera display area A4 is displayed in red (from in black). The highlighting includes displaying in a conspicuous (prominent) display manner (e.g., display color, display size, display mode, etc.). It is preferable to highlight, based on the drone status, one or more specific portions (i.e., portions that especially requires the operator's gazing) among the portions (i.e., various information and images) on the screen where the monitoring information. In particular, highlighting of images may include displaying the frame of the display area of the images in a conspicuous display mode (e.g., displaying the frame in a more prominent color than usual, displaying the frame thicker than usual, or displaying the frame to flash). Alternatively, highlighting of images may include displaying an attention message (for example, a character string) in the display area of the images. Incidentally, in addition to the base camera video, the basic information of the drone D1 may be highlighted.

When the operator OP1 selects (presses) the take-off judgment button B in the drone basic information display area A1 in a state where the drone status of the drone D1 is "BEFORE TAKE-OFF JUDGMENT", a take-off clearance command is transmitted to the management server MS or the drone D1. As a result, the display of the drone status of the drone D1 switches to "AFTER TAKE-OFF JUDGMENT". Thereafter, when the drone D1 takes off from the port P1, the display of the drone status and the drone phase changes (switches) to "IN FLIGHT" as illustrated in FIG. 5, and in synchronization with this, the vehicle camera video in addition to the base camera video is highlighted. For example, frame A41 of the base camera display area A4 and the frame A31 of the vehicle camera display area A3 are displayed in red. Incidentally, when the take-off judgment button B is displayed on the drone monitoring screen, the monitoring information including the information (e.g., the drone name) of the drone Dn to be monitored may be displayed on the action request notification screen together with the information prompting the operator OPm to make the take-off judgment.

[1-3. Configuration and Function of Management Server MS]

Figure 6:
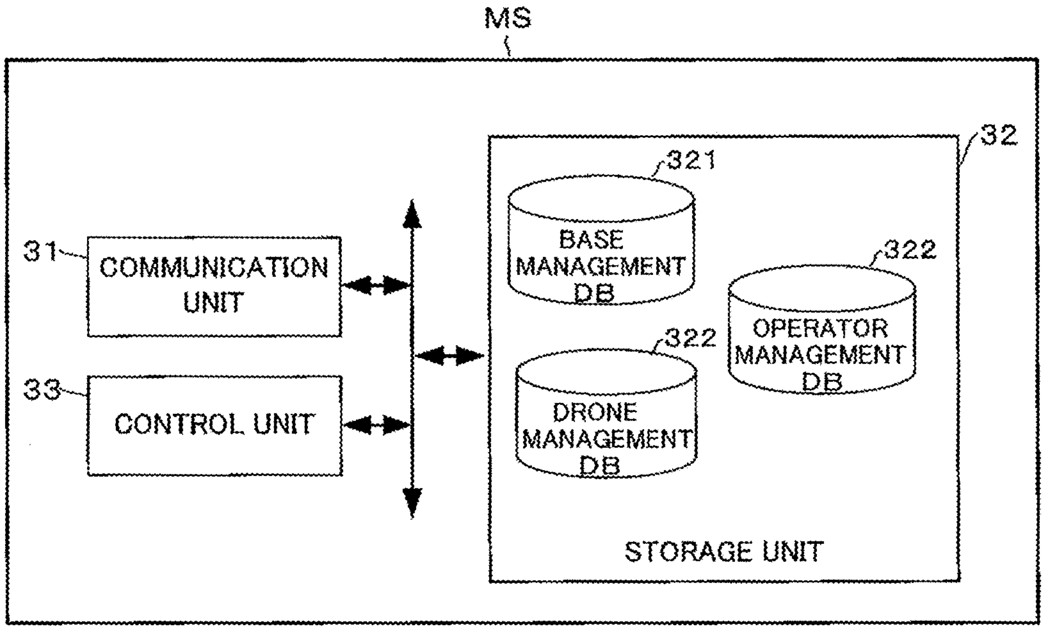
FIG. 6 is a diagram illustrating a schematic configuration example of a management server MS.

Next, a configuration and a function of the management server MS will be described with reference to FIG. 6. FIG. 6 is a diagram illustrating a schematic configuration example of the management server MS. As illustrated in FIG. 6, the management server MS includes a communication unit 31, a storage unit 32, a control unit 33, and the like. The communication unit 31 controls communication performed via the communication network NW. The manual inspection result information, the base image information, the measurement information, and the base ID of the drone base Bm which are transmitted from the base instrument Em, are received by the communication unit 31. The battery information, the capture number information, the vehicle image information, the position information of the drone Dn, the automatic inspection result information, and the vehicle ID of the drone Dn which are transmitted from drone Dn, are received by the communication unit 31. The management server MS can recognize the current position of the drone Dn based on the position information of the drone Dn. Moreover, the login request transmitted from the operator terminal Tm is received by the communication unit 31. Moreover, the weather detailed information transmitted from the weather management server is received by the communication unit 31.

The storage unit 32 includes, for example, a hard disk drive or the like, and stores an operating system, various programs including an application, and the like. Here, the application includes a program for executing an information display method. The program may be stored in a non-transitory computer readable memory. Moreover, the storage unit 32 stores a monitoring priority master table. The monitoring priority master table is a table that registers a monitoring priority (in other words, gazing priority) and a monitoring required timing (criteria) for each drone status that requires monitoring. That is, the monitoring priority master table registers sets of monitoring priorities and monitoring required timings.

FIG. 7 is a diagram illustrating an example of the monitoring priority master table. In the example of FIG. 7, the monitoring priority "1" is associated with "ARRIVAL AT DESTINATION", the monitoring priority "2" is associated with "AFTER TAKE-OFF JUDGMENT", the monitoring priority "3" is associated with "ARRIVAL AT BASE", and the monitoring priority "4" is associated with "TAKE-OFF". In this example, the monitoring priority "1" is the highest. The monitoring priority is determined, for example, by taking into consideration an impact on people and objects when the monitoring information for the drone Dn is not gazed. Incidentally, in the monitoring priority master table, "ABNORMAL OCCURRENCE" may be registered as the drone status that requires monitoring and the highest monitoring priority "O" may be associated with "ABNORMAL OCCURRENCE". Moreover, information indicating the sets of the monitoring priorities and the monitoring required timings may be described in the program for executing the information display method.

Moreover, in the monitoring priority master table, highlighting information may be registered in association with each drone status that requires monitoring. The highlighting information is information for highlighting the specific portion that especially requires the gazing. For example, highlighting information for highlighting the base image (e.g., the base camera video) and the basic information of the drone Dn is associated with "AFTER TAKE-OFF JUDGMENT". Moreover, highlighting information for highlighting the base image and the vehicle image (e.g., the vehicle camera video) is associated with "TAKE-OFF". Moreover, highlighting information for highlighting the vehicle image is associated with "ARRIVAL AT DESTINATION". Incidentally, the highlighting information for highlighting the specific portion may be described in the program for executing the information display method.

Furthermore, a base management database (DB) 321, a drone management database (DB) 322, and an operator management database (DB) 323 are constructed in the storage unit 32. The base management database 321 is a database for managing information on the drone base Bm. In the base management database 321, for example, the base ID of the drone base Bm, the base image information, the measurement information, the weather detailed information, the weather status, the vehicle ID of the drone Dn under the control of the drone base Bm, and the like are stored in association with each drone base Bm. Incidentally, the base image information, the measurement information, and the weather detailed information may be appropriately updated each time they are received by the communication unit 31.

The drone management database 322 is a database for managing information on the drone Dn. In the drone management database 322, the vehicle ID (drone ID), the position information, the basic information, the drone status, the drone phase, the drone schedule, the manual inspection result information, the vehicle data information, the vehicle image information, and the like are stored in association with each drone Dn. The vehicle data information includes, for example, the battery information, the capture number information, and the like. Incidentally, the manual inspection result information, the vehicle data information, the vehicle image information may be appropriately updated each time they are received by the communication unit 31. Moreover, the drone status and the drone phase are updated appropriately based on, for example, various information (including information from the drone Dn) received by the communication unit 31, the drone schedule, or instruction information from a manager (administrator), etc.

The operator management database 323 is a database for managing information on the operator OPm. In the operator management database 323, the user ID of the operator OPm, the password of the operator OPm, a login status, the vehicle ID of each of the plurality of the drones Dn for which the operator OPm is in charge, a name of the operator OPm, and the like are stored in association with each operator OPm. Here, the login status indicates whether the operator OPm logs in.

The control unit 33 (an example of a computer) includes at least one CPU, a ROM, an RAM, and the like, and performs various processes according to the programs (program code) stored in the ROM, the storage unit 32, or the non-transitory computer readable memory. The CPU (an example of processor) is configured to access the program code stored in the ROM, the storage unit 32, or the non-transitory computer readable memory and operate as instructed by the program code. The program code includes: first identification code configured to cause the CPU to identify the drone status of each of the plurality of drones Dn for which the operator OPm is in charge; second identification code configured to cause the CPU to identify, based on the drone status of each of the plurality of the drones Dn, the drone Dn for which the monitoring required timing has arrived among the plurality of the drones Dn; and processing code configured to cause the CPU to notify the operator OPm of the monitoring information for the identified drone Dn. Moreover, the program code further may include first determination code configured to cause the CPU to determine whether the monitoring information for the identified drone Dn is displayed on the screen of the operator terminal Tm. Moreover, the program code further may include: acquisition code configured to cause the CPU to acquire, based on the drone status of each of the plurality of the drones Dn, a monitoring priority of each of the plurality of the drones Dn in a case where the plurality of the drones Dn are identified; and third identification code configured to cause the CPU to identify, by comparing the acquired respective monitoring priorities, the drone Dn with the highest monitoring priority from among the plurality of the identified drones Dn. Moreover, the program code further may include: second determination code configured to cause the CPU to determine whether the monitoring information for a first drone Dn (that is during the monitoring required timing) other than a second drone Dn identified by the second identification code is displayed on the screen of the operator terminal Tm, acquisition code configured to cause the CPU to acquire a first monitoring priority of the first drone Dn based on the drone status of the first drone Dn and a second monitoring priority of the second drone Dn based on the drone status of the second drone Dn; and third determination code configured to cause the CPU to determine, by comparing the first monitoring priority with the second monitoring priority, whether the second monitoring priority is higher than the first monitoring priority in a case where it is determined that the monitoring information for the first drone Dn is displayed on the screen. Moreover, the program code further may include: fourth determination code configured to cause the CPU to determine whether the monitoring required timing of a first drone Dn for which the monitoring information is currently displayed on the screen of the operator terminal Tm, has ended; and fifth determination code configured to cause the CPU to determine whether there is a second drone Dn other than the first drone Dn among the plurality of the drones Dn, the second drone Dn being during the monitoring required timing, in a case where it is determined that the monitoring required timing of the first drone Dn has ended. Moreover, the program code further may include: acquisition code configured to cause the CPU to acquire, based on the drone status of each of a plurality of the second drones Dn, a monitoring priority of each of the plurality of the second drones Dn in a case where it is determined that there are the plurality of the second drone Dn, third identification code configured to cause the CPU to identify, by comparing the acquired respective monitoring priorities, the second drone Dn with the highest monitoring priority from among the plurality of the second drones Dn. Moreover, the program code further may include detection code configured to cause the CPU to detect any abnormality of the drone Dn. Incidentally, the processor may be implemented using circuitry or processing circuitry which includes general purpose processors, special purpose processors, integrated circuits, ASICS, conventional circuitry and/or combinations thereof which are configured or programmed to perform the disclosed functionality. The processor may be hardware (or a combination of hardware and software) that carry out or are programmed to perform the recited functionality.

Figure 8:
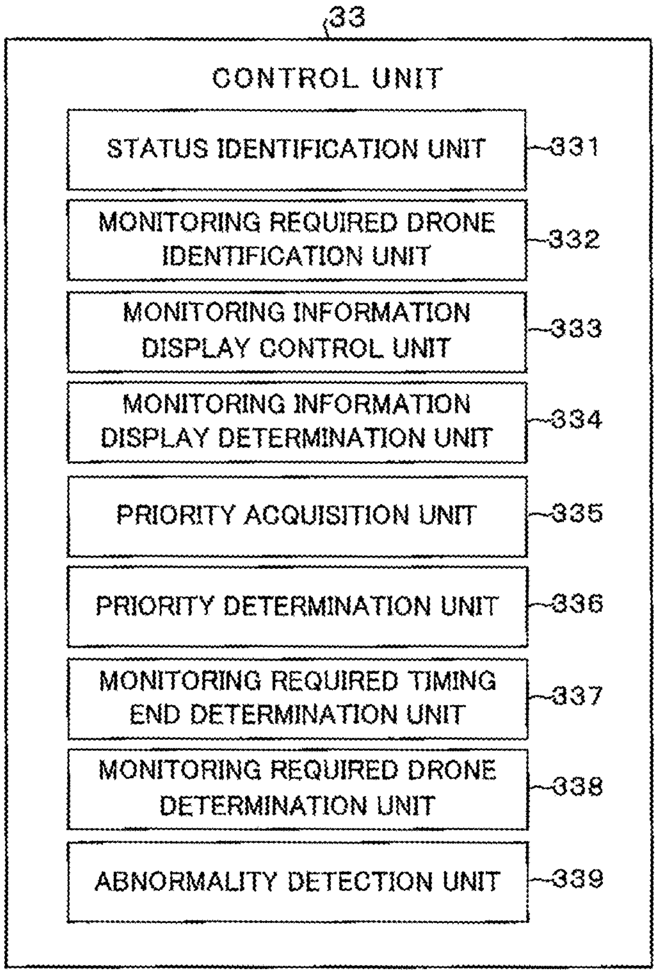
FIG. 8 is a diagram illustrating an example of functional blocks in a control unit 33.

FIG. 8 is a diagram illustrating an example of functional blocks in the control unit 33. The control unit 33 functions a status identification unit 331, a monitoring required drone identification unit 332, a monitoring information display control unit 333, a monitoring information display determination unit 334, a priority acquisition unit 335, a priority determination unit 336, a monitoring required timing end determination unit 337, a monitoring required drone determination unit 338, an abnormality detection unit 339, and the like as illustrated in FIG. 8, in accordance with the program (the program code) stored in the ROM, the storage unit 32, or the non-transitory computer readable memory.

The status identification unit 331 identifies the current drone status of each of the plurality of the drones Dn for which the logged-in operator OPm is in charge, for example, from the drone management database 322. The monitoring required drone identification unit 332 identifies, based on each drone status identified by the status identification unit 331, the drone Dn for which the monitoring required timing has arrived (started) among the plurality of the drones Dn for which the operator OPm is in charge. For example, the monitoring required drone identification unit 332 determines whether the monitoring required timing has arrived for each drone Dn based on the current time, and the monitoring required timing (i.e., the criteria in the monitoring priority master table) associated with each drone status identified by the status identification unit 331, and thereby identifies the drone Dn for which the monitoring required timing has arrived. Incidentally, said “the monitoring required timing has arrived” means that the current time comes a starting point of the monitoring required timing.

The monitoring information display control unit 333 transmits, to the operator terminal Tm, display control data for displaying the monitoring information for the drone Dn identified by the monitoring required drone identification unit 332. As a result, the monitoring information for the drone Dn and the like are displayed on the drone monitoring screen of the operator terminal Tm. For example, the simple information display area LA1 shown in FIG. 4 is in a selected state, and the monitoring information for the drone D1 is displayed in the drone basic information display area A1, the drone detailed information display area A2, the vehicle camera display area A3, and the base camera display area A4. Accordingly, in response to the arrival of the monitoring required timing, the monitoring information for the identified drone Dn is automatically notified to the operator OPm via the operator terminal Tm. Therefore, it is possible to prevent human error caused by the operator OPm in a case where the operator OPm monitors the plurality of the drones Dn during the same period (i.e., the period during which monitoring tasks is performed). Incidentally, when the take-off judgment button B is displayed on the drone monitoring screen, the monitoring information display control unit 333 may cause the operator terminal Tm to display the monitoring information including the information (e.g., the drone name) of the drone Dn to be monitored on the action request notification screen, along with information prompting the operator OPm to make the take-off judgment.

Moreover, the monitoring information display control unit 333 may cause, based on the drone status of the drone Dn identified by the monitoring required drone identification unit 332, the operator terminal Tm to highlight the specific portion that especially requires the gazing by the operator OPm in the monitoring information for the drone Dn. For example, the monitoring information display control unit 333 acquires, from the monitoring priority master table, the highlighting information associated with the drone status of the drone Dn identified by the monitoring required drone identification unit 332, and transmits display control data including the acquired highlighting information to the operator terminal Tm. This makes it possible to more accurately prevent human error caused by the operator OPm. For example, as shown in FIGS. 4 and 5, the monitoring information display control unit 333 may cause, by transmitting display control data, the operator terminal Tm to highlight one or more images including at least one of the vehicle image (e.g., vehicle camera video) and the base image (e.g., base camera video) in accordance with the drone status (i.e., the current drone status) of the drone Dn identified by the monitoring required drone identification unit 332.

When the drone Dn is identified by the monitoring required drone identification unit 332, the monitoring information display determination unit 334 determines whether the monitoring information for the identified drone Dn is already displayed on the drone monitoring screen of the operator terminal Tm. Then, when it is determined by the monitoring information display determination unit 334 that the monitoring information for the drone Dn is not displayed on the drone monitoring screen, the monitoring information display control unit 333 may transmit, to the operator terminal Tm, the display control data for displaying the monitoring information for the identified drone Dn on the drone monitoring screen. As a result, the monitoring information for the drone Dn is displayed on the drone monitoring screen of the operator terminal Tm. Thus, when it is determined that the monitoring information for the identified drone Dn is already displayed on the drone monitoring screen, since it is not necessary to transmit the display control data for displaying the monitoring information for the identified drone Dn, it is possible to reduce a system load.

When the plurality of the drones Dn are identified by the monitoring required drone identification unit 332 (i.e., when the monitoring required timing overlapped), the priority acquisition unit 335 acquires, based on the drone status (i.e., the current drone status) of each of the identified plurality of the drones Dn, the monitoring priority of each of the identified plurality of the drones Dn. For example, the priority acquisition unit 335 acquires, from the monitoring priority master table, the monitoring priority associated with the drone status (i.e., the current drone status) of each of the identified plurality of the drones Dn. Then, the monitoring required drone identification unit 332 identifies, by comparing the respective monitoring priorities acquired by the priority acquisition unit 335, one drone Dn with the highest monitoring priority from among the identified plurality of the drones Dn. The monitoring information for the drone Dn (i.e., the drone Dn with the highest monitoring priority) that is finally identified in this manner is displayed on the drone monitoring screen. This makes it possible to more accurately prevent human error caused by operator OPm, even if the plurality of monitoring required timings overlap.

Moreover, the monitoring information display determination unit 334 may determine whether the monitoring information for a first drone Dn (e.g., the drone D1) that is during the monitoring required timing (i.e., the monitoring required timing has not ended) is already displayed on the drone monitoring screen other than a second drone Dn (e.g., the drone D2) identified by the monitoring required drone identification unit 332 among the plurality of the drones Dn for which the operator OPm is in charge. Here, the first drone Dn that is during the monitoring required timing is the drone Dn identified by the monitoring required drone identification unit 332 before the second drone Dn. When it is determined that the monitoring information for the first drone Dn is already displayed on the drone monitoring screen other than the second drone Dn (i.e., before the second drone Dn), the priority acquisition unit 335 acquires the monitoring priority (hereinafter referred to as the "first monitoring priority") of the first drone Dn based on the drone status (i.e., the current drone status) of the first drone Dn and the monitoring priority (hereinafter referred to as the "second monitoring priority") of the second drone Dn based on the drone status (i.e., the current drone status) of the second drone Dn.

Then, the priority determination unit 336 determines, by comparing the first monitoring priority with the second monitoring priority acquired by the priority acquisition unit 335, whether the second monitoring priority is higher than the first monitoring priority. When it is determined by the priority determination unit 336 that the second monitoring priority is higher than the first monitoring priority, the monitoring information display control unit 333 transmits, to the operator terminal Tm, display control data for displaying (i.e., switching to the display of the monitoring information) the monitoring information for the identified second drone Dn. As a result, the display (screen) of the monitoring information for the first drone Dn is switched to the display (screen) of the monitoring information for the second drone Dn. This makes it possible to more accurately prevent human error caused by operator OPm, even if the plurality of the monitoring required timings overlap.

Figure 9:
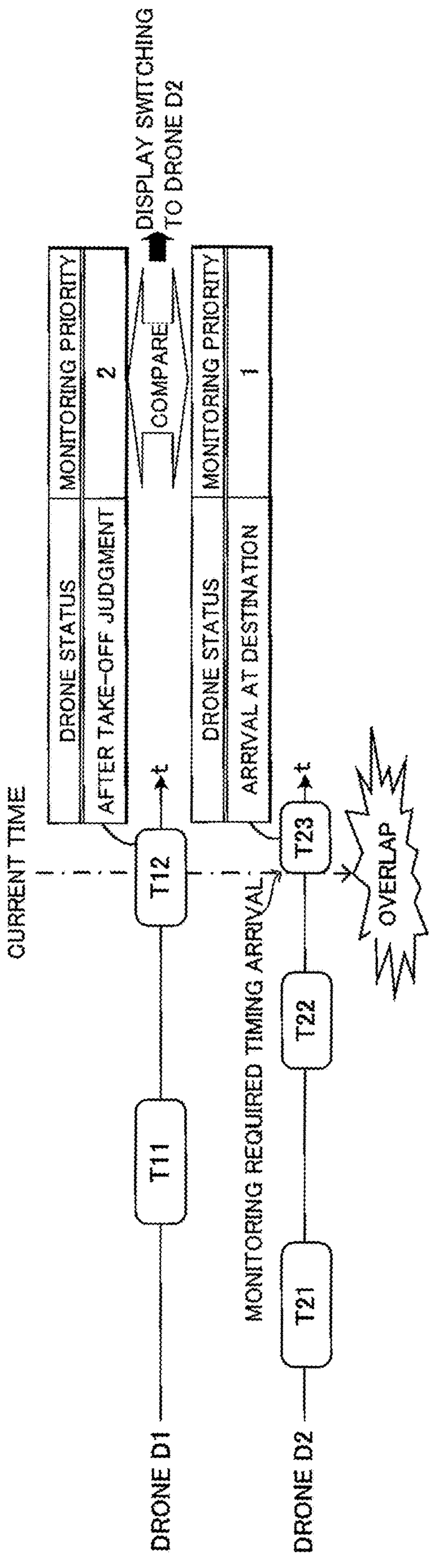
FIG. 9 is a conceptual diagram representing monitoring required timings of a drone D1 and monitoring required timings of a drone D2 in chronological order.

FIG. 9 is a conceptual diagram representing the monitoring required timings T11 and T12 of the drone D1 and the monitoring required timings T21, T22, and T23 of the drone D2 in chronological order. In the example of FIG. 9, it is shown that the monitoring required timing T23 of the drone D2 overlapped, due to the arrival of the monitoring required timing T23 of the drone D2, with the monitoring required timing T12 of the drone D1 for which the monitoring information is displayed. In this case, the monitoring required timing T12 of the drone D1 for which the monitoring information is displayed, corresponds to the drone status "AFTER TAKE-OFF JUDGMENT" and the monitoring priority "2" (an example of the first monitoring priority) is associated with "AFTER TAKE-OFF JUDGMENT". On the other hand, the monitoring required timing T23 of the drone D2 corresponds to the drone status "ARRIVAL AT DESTINATION" and the monitoring priority "1" (an example of the second monitoring priority) is associated with "ARRIVAL AT DESTINATION". In this case, it is determined that the second monitoring priority "1"

is higher than the first monitoring priority "2", and the display of the monitoring information for the drone D1 is switched to the display of the monitoring information for the drone D2. Incidentally, if the monitoring priority of the drone D1 and the monitoring priority of the drone D2 are the same, the display of the monitoring information for drone D1, whose arrival of the monitoring required timing is faster than that of drone D2, is maintained (i.e., the display is not switched).

Figure 10:
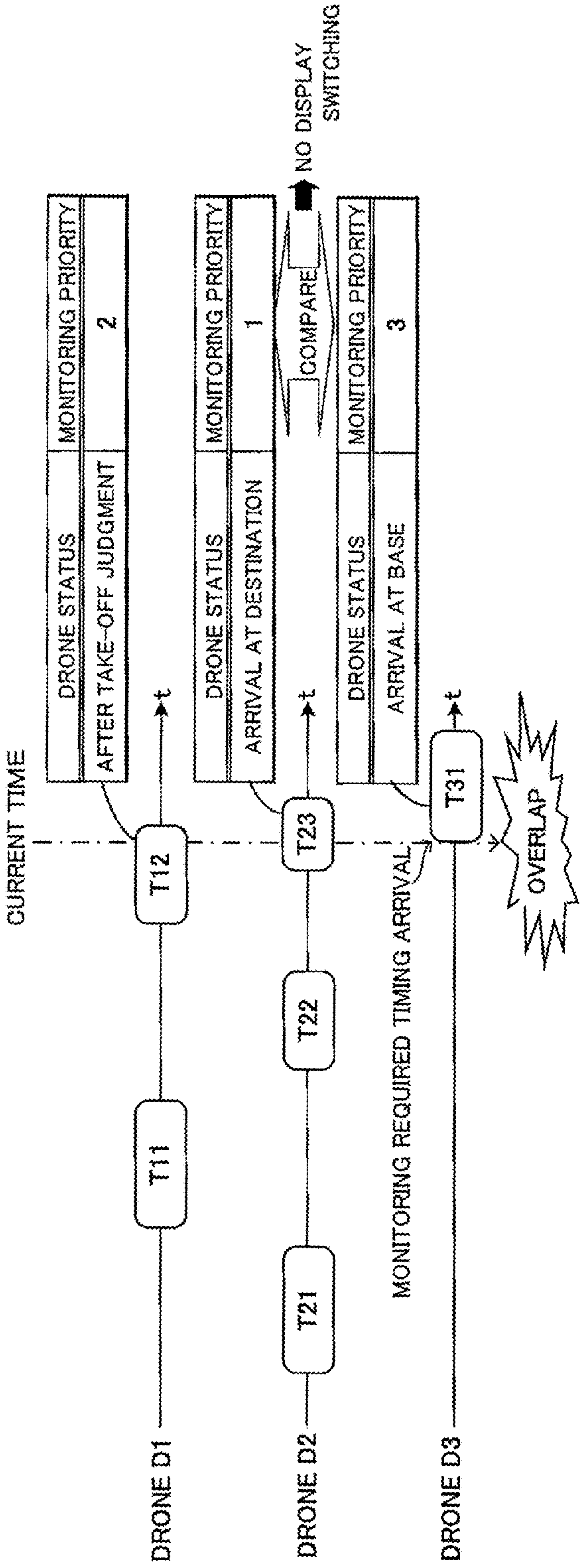
FIG. 10 is a conceptual diagram representing monitoring required timings of a drone D1, monitoring required timings of a drone D2, and a monitoring required timing of a drone D3 in chronological order.

FIG. 10 is a conceptual diagram representing the monitoring required timings T11 and T12 of the drone D1, the monitoring required timings T21, T22, and T23 of the drone D2, and the monitoring required timing T31 of the drone D3 in chronological order. In the example of FIG. 10, it is shown that in a state where the monitoring required timing T12 of the drone D1 and the monitoring required timing T23 of the drone D2 (at this time, the monitoring information for the drone D2 is displayed) overlap, the monitoring required timing T31 of the drone D3 overlaps, due to the arrival of the monitoring required timing T31 of the drone D3, with the monitoring required timing T12 of the drone D1 and the monitoring required timing T23 of the drone D2. In this case, the monitoring required timing T23 of the drone D2 for which the monitoring information is displayed, corresponds to the drone status "ARRIVAL AT DESTINATION" and the monitoring priority "1" (an example of the first monitoring priority) is associated with "ARRIVAL AT DESTINATION". On the other hand, the monitoring required timing T31 of the drone D3 corresponds to the drone status "ARRIVAL AT BASE" and the monitoring priority "3" (an example of the second monitoring priority): is associated with "ARRIVAL AT BASE". In this case, it is determined that the second monitoring priority "3" is lower than the first monitoring priority "1", and the display of the monitoring information for drone D2 is maintained (that is, the display is not switched).

The monitoring required timing end determination unit 337 determines whether the monitoring required timing of a first drone Dn (in this example, the drone D1) for which the monitoring information is currently displayed on the drone monitoring screen, has ended. Incidentally, said "the monitoring required timing has ended" means that the current time comes an end point of the monitoring required timing. When it is determined by the monitoring required timing end determination unit 337 that the monitoring required timing of the first drone Dn has ended, the monitoring required drone determination unit 338 determines whether there is a second drone Dn being during the monitoring required timing, other than the first drone Dn (in this example, the drone D1) among the plurality of the drones Dn for which the operator OPm is in charge. Then, when it is determined by the monitoring required drone determination unit 338 that there is the second drone Dn being during the monitoring required timing, the monitoring information display control unit 333 causes, by transmitting display control data, the operator terminal Tm to switch from displaying the monitoring information for the first drone Dn to displaying the monitoring information for the second drone Dn. This makes it possible to quickly display, in response to the end of the monitoring required timing for the first drone Dn, the monitoring information for the second drone Dn that is still during the monitoring required timing.

Moreover, when it is determined by the monitoring required drone determination unit 338 that there are a plurality of the second drones Dn being during the monitoring required timing, the priority acquisition unit 335 acquires, based on the drone status (i.e., the current drone status) of each of the plurality of the second drones Dn, the monitoring priority of each of the plurality of the second drones Dn. The monitoring required drone identification unit 332 identifies, by comparing the respective monitoring priorities acquired by the priority acquisition unit 335, one second drone Dn with the highest monitoring priority from among the plurality of the second drones Dn. Then, the monitoring information display control unit 333 causes, by transmitting display control data, the operator terminal Tm to switch from displaying the monitoring information for the first drone Dn whose the monitoring required timing has ended, to displaying the monitoring information for the second drone Dn (i.e., the second drone Dn with the highest monitoring priority) identified by the monitoring required drone identification unit 332. This makes it possible to quickly display, in response to the end of the monitoring required timing for the first drone Dn, the monitoring information for the second drone Dn that should be most monitored among the plurality of the second drones Dn that are still during the monitoring required timing.

Figure 11:
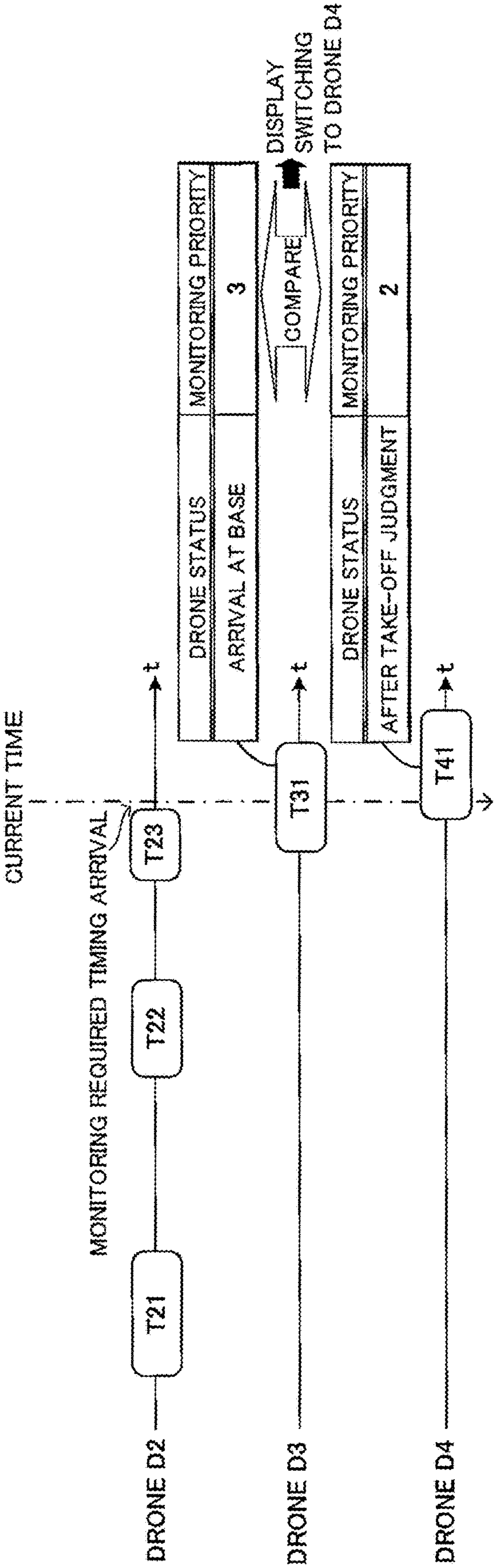
FIG. 11 is a conceptual diagram representing monitoring timings of a drone D2, a monitoring required timing of a drone D3, and a monitoring required timing of a drone D4 in chronological order.

FIG. 11 is a conceptual diagram representing the monitoring required timings T21, T22, and T23 of the drone D2, the monitoring required timing T31 of the drone D3, and the monitoring required timing T41 of the drone D4 in chronological order. In the example of FIG. 11, it is shown that the monitoring required timing T31 of the drone D3 and the monitoring required timing T41 of the drone D4 overlap after the monitoring required timing T23 of the drone D2 for which the monitoring information is displayed is ended. In this case, the monitoring required timing T31 of the drone D3 corresponds to the drone status "ARRIVAL AT BASE" and the monitoring priority "3" is associated with "ARRIVAL AT BASE". On the other hand, the monitoring required timing T41 of the drone D4 corresponds to the drone status "AFTER TAKE-OFF JUDGMENT" and the monitoring priority "2" is associated with "AFTER TAKE-OFF JUDGMENT". Therefore, the drone D4 with the monitoring priority higher than the drone D3 is identified, and the display of the monitoring information for the drone D2 is switched to the display of the monitoring information for the drone D4. Incidentally, if the monitoring priority of the drone D3 and the monitoring priority of the drone D4 are the same, it is preferable to display monitoring information for drone D3, whose arrival of the monitoring required timing is faster than that of drone D4.

The abnormality detection unit 339 detects any abnormality of the drone Dn by processing, for example, such as analyzing images including at least one of the vehicle image and the base image. This makes it possible to quickly detect that there is any abnormality with respect to the drone Dn by analyzing the vehicle image or the base image. For example, the abnormality detection unit 339 detects the abnormality of the drone Dn when the brightness of the vehicle image or the base image is equal to or less than a threshold value (e.g., black (minimum brightness)). Alternatively, abnormality detection unit 339 checks presence or absence of an airframe outwardly expressing a drone by analyzing the base image (for example, the base camera video), and detects that there is the abnormality when the airframe cannot be detected from the base image (i.e., when the airframe does not appear in the base image). Here, the presence or absence of the airframe may be checked based on the pre-registered airframe appearance image (which may be a feature point). Incidentally, the drone status of the drone Dn in which the abnormality has been detected may be changed to "ABNORMAL OCCURRENCE".

Then, in a state where the monitoring information for the first the drone Dn identified by the monitoring required drone identification unit 332 is displayed on the drone monitoring screen, the monitoring information display control unit 333 causes, by transmitting display control data in response to detecting of the abnormality of a second drone Dn other than the identified first drone Dn among the plurality of the drones Dn for which the operator OPm is in charge, the operator terminal Tm to switch from displaying the monitoring information for the identified first drone Dn to displaying the monitoring information for the second drone Dn in which the abnormality has been detected. This makes it possible to quickly display, with the highest priority in response to the occurrence of the abnormality of the drone Dn, the monitoring information for the drone Dn in which the abnormality has been detected. In addition, even if the number of the drones Dn to be monitored by one operator OPm becomes huge in the future, the operator OPm can be strongly supported.

However, if a processing to detect the abnormality is constantly executed for all the drones Dn, since a system load becomes higher, the abnormality detection unit 339 may be configured to detect the abnormality only for drones Dn (e.g., the drone D1 as shown in FIG. 9, the drone D1 and the drone D3 as shown in FIG. 10) for which the monitoring required timing has arrived (i.e., drones Dn that are during the monitoring required timing) and for which the monitoring information is currently not displayed on the drone monitoring screen. In other words, detecting of the abnormality is performed only at the timing when the drone Dn, which is unable to display monitoring information despite the need for the operator's gazing, occurs. This makes it possible to reduce the system load. Incidentally, the abnormality of the drone Dn may be detected based on the automatic inspection result information received by the communication unit 31.

Incidentally, the monitoring information display control unit 333 may notify, in response to switching of displaying the monitoring information for the drone Dn, the operator OPm of information indicating that the display (screen) of the monitoring information has been switched. This allows the operator OPm to quickly grasp that the display of the monitoring information for the drone Dn has been switched. For example, the monitoring information display control unit 333 transmits a message indicating that the display of the monitoring information has been switched (e.g., "Switch screen to a drone (drone D2) that needs to be gazed") to the operator terminal Tm, and thereby causes the operator terminal Tm to display a pop-up screen showing the message on the drone monitoring screen.

Moreover, the monitoring information display control unit 333 may cause, in response to switching of displaying the monitoring information for the drone Dn (e.g., switching from the first drone Dn to the second drone Dn), the operator terminal Tm to display (e.g., wipe display) a portion of the monitoring information (e.g., for the first drone Dn) was displayed on the drone monitoring screen before switching of the display at a position that does not interfere with the display of the monitoring information (e.g., for the second drone Dn) after switching of the display on the drone monitoring screen. This makes it possible to continuously indicate, to the operator OPm, the portion of the monitoring information for the drone Dn that was not identified as the display target of the monitoring information. For example, the monitoring information display control unit 333 transmits, to the operator terminal Tm, display control data for displaying the portion of the monitoring information was displayed on the drone monitoring screen before switching of the display. As a result, the portion of the monitoring information for the drone Dn is displayed on the drone monitoring screen of the operator terminal Tm. Here, the portion of the monitoring information may be at least one of the images of the vehicle image (e.g., the vehicle camera video) and the base image (e.g., the base camera video). This makes it possible to indicate, to the operator OPm, at least one of the images regarding the drone Dn that was not identified as the display target of the monitoring information.

Figure 12:
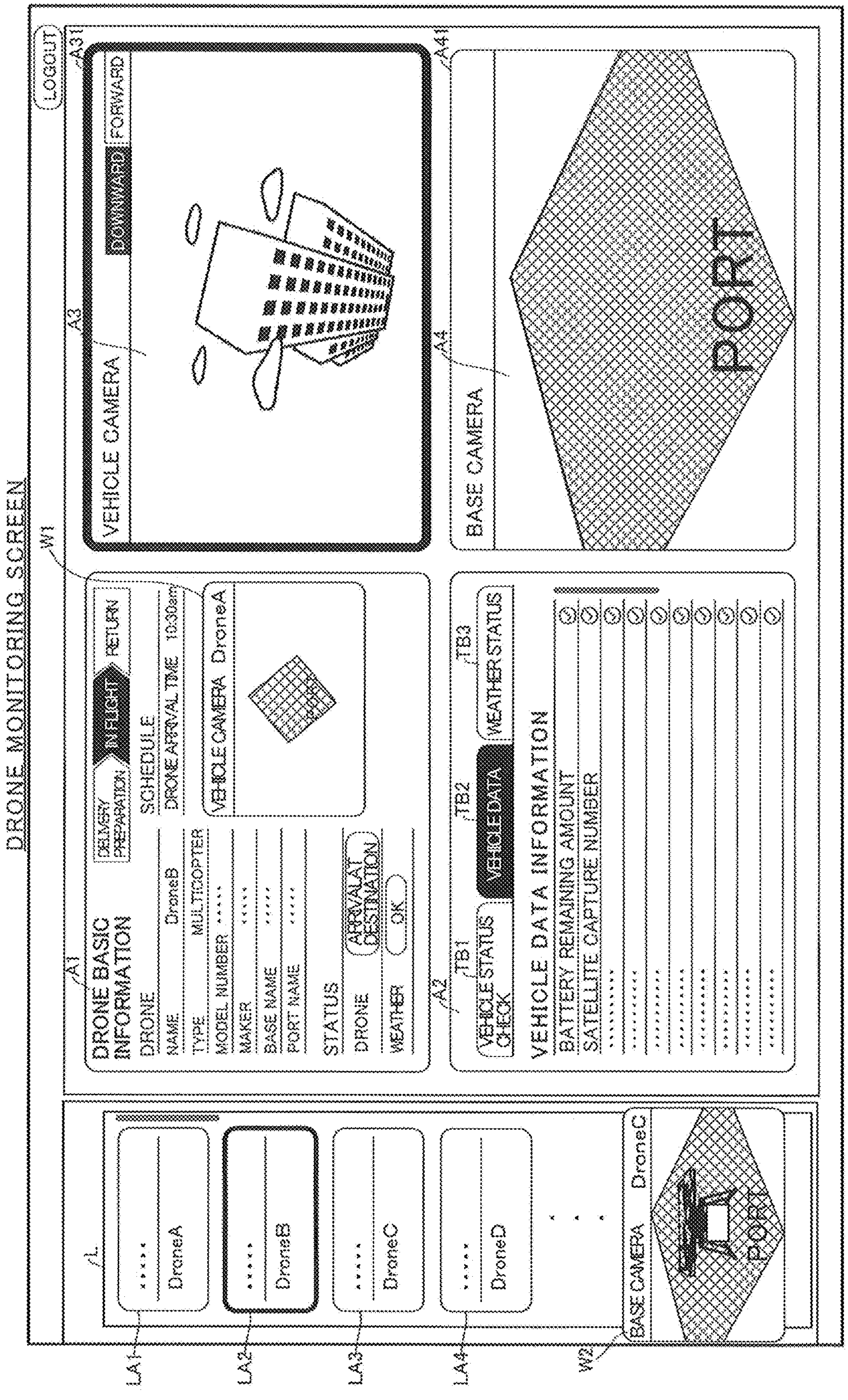
FIG. 12 is a diagram illustrating a display example of a drone monitoring screen in which a vehicle camera video of a drone D1 and a base camera video regarding a drone D3 are displayed at a position that does not interfere with a display of monitoring information for a drone D2.

FIG. 12 is a diagram illustrating a display example of the drone monitoring screen in which the vehicle camera video of the drone D1 and the base camera video regarding the drone D3 are displayed at the position that does not interfere with the display of monitoring information for the drone D2. In the example of FIG. 12, the monitoring information display control unit 333 selects, based on the drone status (i.e., the current drone status) of each of the drone D1 and D3 for which the monitoring information was displayed on the drone monitoring screen before switching of the display, one image of the vehicle camera video and the base camera video as the portion of the monitoring information, and causes the operator terminal Tm to display the selected image in wipe windows W1 and W2. This makes it possible to indicate, to the operator OPm, a more suitable image according to the current drone status of the drone Dn even after switching the display. Incidentally, if the drone status indicates that the drone Dn is taking off or landing, the base image (e.g., base camera video) may be selected. On the other hand, if the drone status indicates that the drone Dn has arrived at the destination, the vehicle image (e.g., vehicle camera video) may be selected.

[2. Operation of Remote Monitoring System S]

Figure 13:
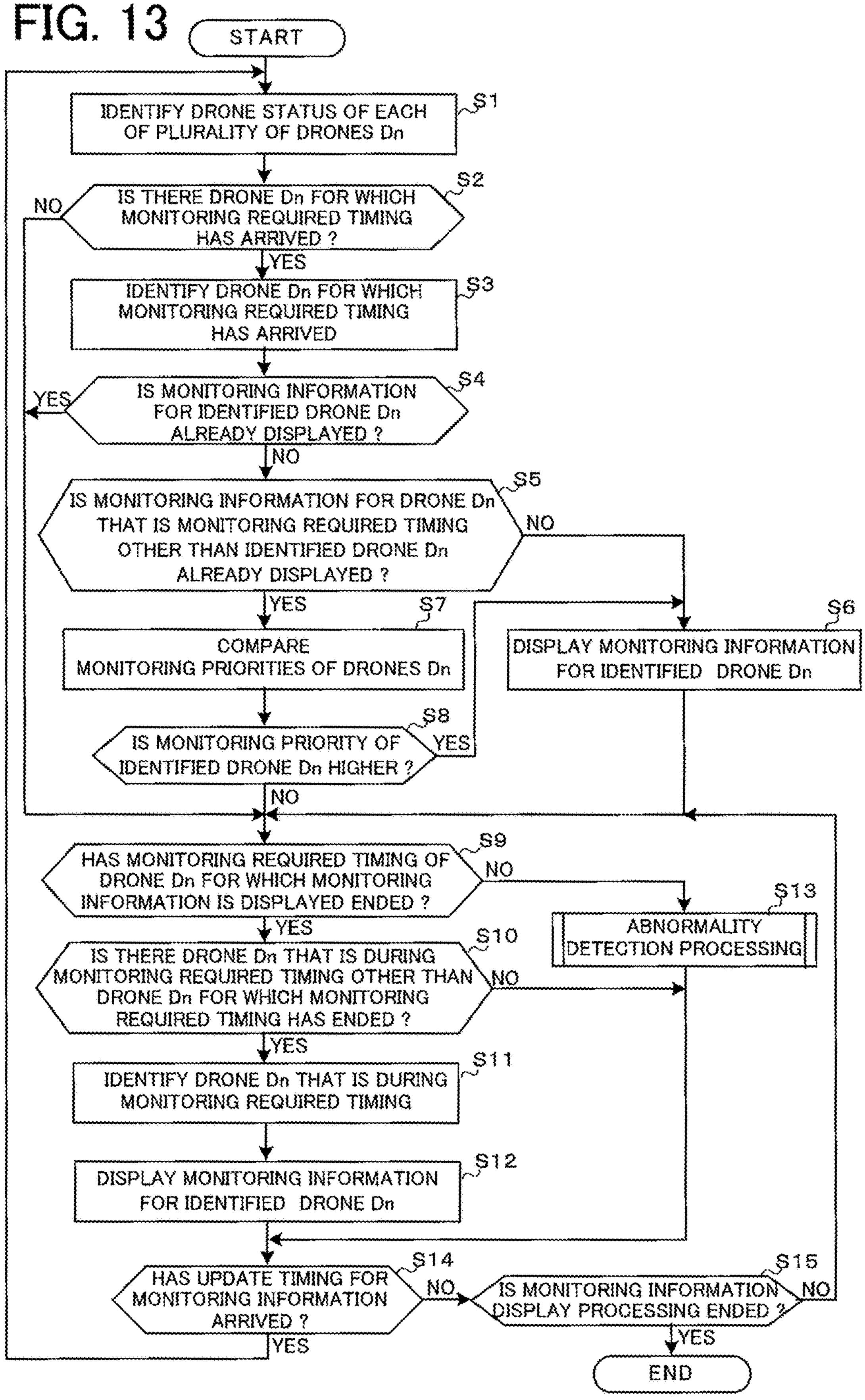
FIG. 13 is a flowchart illustrating an example of a monitoring information display processing executed by the control unit 33 of the management server MS.
Figure 14:
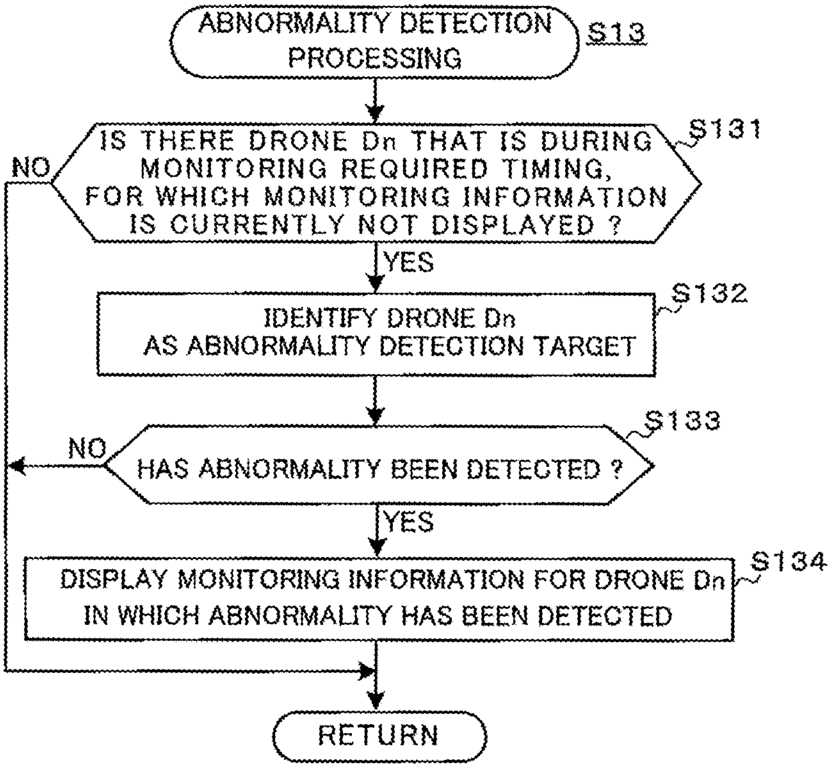
FIG. 14 is a flowchart illustrating an example of an abnormality detection processing in step S13 shown in FIG. 13.

Next, an operation of the remote monitoring system S will be described with reference to FIGS. 13 and 14. FIG. 13 is a flowchart illustrating an example of a monitoring information display processing executed by the control unit 33 of the management server MS. FIG. 14 is a flowchart illustrating an example of an abnormality detection processing in step S13 shown in FIG. 13, which is executed by the control unit 33 of the management server MS. Incidentally, as a premise of the following description of the operation example, the operator OP of the operator terminal T1 is logged in, the plurality of the drones Dn for which the logged-in operator OP1 is in charge are identified, and the drone monitoring screen including the drone list indicating the identified plurality of the drones Dn is already displayed on the operator terminal T1. When the operator OP1 logs in in this way, the management server MS continuously recognizes (monitors) a display state (including the display content of the monitoring information) of the drone monitoring screen in the operator terminal T1.

The processing illustrated in FIG. 13 is started, for example, when the drone monitoring screen is displayed on the operator terminal T1. The processing illustrated in FIG. 13 is started, the control unit 33 identifies, by the status identification unit 331, the drone status of each of the plurality of the drones Dn for which the operator OP1 is in charge, for example, from the drone management database 322 (step S1).

Next, the control unit 33 determines, based on each drone status identified in step S1, whether there is the drone Dn for which the monitoring required timing has arrived among the plurality of the drone Dn for which the operator OP1 is in charge (step S2). When it is determined that there is the drone Dn for which the monitoring required timing has arrived (step S2: YES), the process proceeds to step S3. On the other hand, when it is determined that there is not the drone Dn for which the monitoring required timing has arrived (step S2: NO), the process proceeds to step S9.

In step S3, the control unit 33 identifies, by the monitoring required drone identification unit 332, one drone Dn for which the monitoring required timing has arrived. Incidentally, when the plurality of the drones Dn for which the monitoring required timing has arrived, are identified, the priority acquisition unit 335 acquires (for example, stores on the RAM), based on the drone status of each of the identified plurality of the drones Dn as described above, the monitoring priority of each of the identified plurality of the drones Dn. Then, the monitoring required drone identification unit 332 identifies, by comparing the respective monitoring priorities acquired by the priority acquisition unit 335, one drone Dn with the highest monitoring priority from among the identified plurality of the drones Dn.

Next, the control unit 33 determines, based on the display state of the drone monitoring screen, whether the monitoring information for the drone Dn identified in step S3 is already displayed on the drone monitoring screen of the operator terminal T1, by the monitoring information display determination unit 334 (step S4). When it is determined that the monitoring information for the identified drone Dn is not displayed on the drone monitoring screen (step S4: NO), the process proceeds to step S5. On the other hand, when it is determined that the monitoring information for the identified drone Dn is already displayed on the drone monitoring screen (step S4: YES), the process proceeds to step S9.

In step S5, the control unit 33 determines, based on the display state of the drone monitoring screen, whether monitoring information for the other drone Dn (the first drone Dn) being during the monitoring required timing, other than the drone Dn (the second drone Dn) identified in step S3, is already displayed on the drone monitoring screen of the operator terminal T1, by the monitoring information display determination unit 334. When it is determined that the monitoring information for the other drone Dn is not displayed on the drone monitoring screen (step S5: NO), the process proceeds to step S6. On the other hand, when it is determined that the monitoring information for the other drone Dn is already displayed on the drone monitoring screen (step S5: YES), the process proceeds to step S7.

In step S6, the control unit 33 causes, by the monitoring information display control unit 333, the monitoring information for the drone Dn identified in step S3, to be displayed on the drone monitoring screen of the operator terminal T1. For example, the monitoring information display control unit 333 transmits, to the operator terminal Tm via the communication unit 31, display control data for displaying the monitoring information for the drone Dn identified in step S3, and the process proceeds to step S9. At this time, the monitoring information display control unit 333 may cause, based on the drone status of the drone Dn identified in step S3, the specific portion (i.e., a portion especially requires the gazing by the operator OP1 in the monitoring information for the drone Dn) to be highlighted, as described above.

In step S7, the control unit 33 acquires the monitoring priority of the identified drone Dn on the basis of the drone status of the drone Dn identified in step S3, and acquires the monitoring priority of the other drone Dn on the basis of the drone status of the other drone Dn being during the monitoring required timing. Then, the control unit 33 compares the acquired first monitoring priority with the acquired second monitoring priority. Incidentally, the monitoring priorities of the drones Dn may be acquired prior to step S5 (e.g., step S1). Next, the control unit 33 determines, by the priority determination unit 336, whether the monitoring priority of the drone Dn (the second drone Dn) identified in step S3 is higher than the monitoring priority of the other drone Dn (the first drone Dn) being during the monitoring required timing (step S8).

Then, when it is determined that the monitoring priority of the drone Dn identified in step S3 is not higher (i.e., lower) than the monitoring priority of the other drone Dn (step S8: NO), the display switching of the monitoring information is not performed, and the process proceeds to step S9. On the other hand, when it is determined that the monitoring priority of the drone Dn identified in step S3 is higher than the monitoring priority of the other drone Dn (step S8: YES), the process moves to step S6, and the display switching of the monitoring information is performed by the process of step S6. At this time, the monitoring information display control unit 333 may transmit the message indicating that the display of the monitoring information has been switched to the operator terminal Tm, and thereby cause the pop-up screen showing the message to be displayed on the drone monitoring screen.

In step S9, the control unit 33 determines, by the monitoring required timing end determination unit 337, whether the monitoring required timing of the drone Dn for which the monitoring information is currently displayed on the drone monitoring screen, has ended. When it is determined that the monitoring required timing of the drone Dn has ended (step S9: YES), the process proceeds to step S10. On the other hand, when it is determined that the monitoring required timing of the drone Dn has not ended (step S9: NO), the process proceeds to step S13. Incidentally, although it is not shown, if the monitoring information is not displayed on the drone monitoring screen (e.g., in the case immediately after the login of the operator OP1), or if the drone Dn corresponding to the monitoring information being displayed on the drone monitoring screen is not during the monitoring required timing, the process may proceed to step S14.

In step S10, the control unit 33 determines, by the monitoring required drone determination unit 338, whether there is another drone Dn being during the monitoring required timing, other than the drone Dn for which the monitoring required timing has ended among the plurality of drones Dn for which the operator OP1 is in charge. When it is determined that the there is the other drone Dn being during the monitoring required timing (step S10: YES), the process proceeds to step S11. On the other hand, when it is determined that there is not the other drone Dn being during the monitoring required timing (step S10: NO), the display of the monitoring information (for the drone Dn for which the monitoring required timing has ended) is continued, and the process proceeds to step S14.

In step S11, the control unit 33 identifies one drone Dn being the monitoring during required timing. Incidentally, when the plurality of the drones Dn being the monitoring required timing are identified, as described above, the priority acquisition unit 335 acquires, based on the drone status of each of the identified plurality of the drones Dn, the monitoring priority of each of the identified plurality of drones Dn. Then, the monitoring required drone identification unit 332 identifies, by comparing the respective monitoring priorities acquired by the priority acquisition unit 335, one drone Dn with the highest monitoring priority from among the identified plurality of the drones Dn.

Next, the control unit 33 causes, by the monitoring information display control unit 333, the monitoring information for the drone Dn identified in step S11, to be displayed on the drone monitoring screen of the operator terminal T1 (i.e., the display of the monitoring information is switched), similarly to step S6. At this time, the monitoring information display control unit 333 may cause, based on the drone status of the drone Dn identified in step S11, the specific portion to be highlighted, as described above. Furthermore, the monitoring information display control unit 333 may cause the pop-up screen showing the message indicating that the display of the monitoring information has been switched, to be displayed on the drone monitoring screen, as described above.

In step S13, the control unit 33 executes the abnormality detection processing. In the abnormality detection processing, as shown in FIG. 14, the control unit 33 determines whether there is the drone Dn being during the monitoring required timing, for which the monitoring information is currently not displayed on the drone monitoring screen among the drones Dn for which the operator OP1 is in charge (step S131). When it is determined that there is not the drone Dn being during the monitoring required timing, for which the monitoring information is currently not displayed on the drone monitoring screen (step S131: NO), the process proceeds to the step S14 shown in FIG. 13. On the other hand, when it is determined that there is the drone Dn being during the monitoring required timing, for which the monitoring information is currently not displayed on the drone monitoring screen (step S131: YES), the process proceeds to step S132.

In step S132, the control unit 33 identifies, as an abnormality detection target, the drone Dn being during the monitoring required timing, for which the monitoring information is currently not displayed on the drone monitoring screen. Next, the control unit 33 determines whether any abnormality with respect to the drone Dn identified in step S132 has been detected by causing the abnormality detection unit 339 to perform processing such as analyzing images including at least one of the vehicle image and the base image (step S133). When it is determined that the abnormality has not been detected (step S133: NO), the process proceeds to the step S14 shown in FIG. 13. On the other hand, when it is determined that the abnormality has been detected (step S133: YES), the process proceeds to step S134.

In step S134, the control unit 33 causes the operator terminal Tm to display the monitoring information for the drone Dn in which the abnormality has been detected in step S133 on the drone monitoring screen of the operator terminal T1 (i.e., the display of the monitoring information is switched), by the monitoring information display control unit 333 similarly to step S6. At this time, the monitoring information display control unit 333 may cause, based on the drone status of the drone Dn in which the abnormality has been detected, the specific portion (i.e., a portion especially requires the gazing by the operator OP1 in the monitoring information for the drone Dn) to be highlighted, as described above. Furthermore, the monitoring information display control unit 333 may cause the pop-up screen showing the message indicating that the display of the monitoring information has been switched because the abnormality has been detected, to be displayed on the drone monitoring screen, as described above.

Then, returning to the processing illustrated in FIG. 13, in step S14, the control unit 33 determines whether an update timing for the monitoring information has arrived. For example, it may be set by a timer so that the update timing arrives every predetermined time interval. When it is determined that the update timing for the monitoring information has arrived (step S14: YES), the process returns to step S1, and the same processing as described above is performed. On the other hand, when it is determined that the update timing for the monitoring information has not arrived (step S14: NO), the process proceeds to step S15.

In step S15, the control unit 33 determines whether to end the monitoring information display processing. For example, when the operator OP1 logs out or when a screen transition request is received from the operator terminal T1 in response to a transition instruction to another screen by the operator OP1 (step S15: YES), and the monitoring information display processing illustrated in FIG. 13 is ended. On the other hand, when it is determined that the monitoring information display processing is not ended (step S15: NO), the process returns to step S9.

As described above, according to the embodiment, the management server MS identifies the drone status of each of the plurality of drones Dn for which the operator OPm is in charge, identifies, based on the identified each drone status, the drone Dn for which the monitoring required timing has arrived, and notifies the operator OPm of the monitoring information for the identified drone Dn by causing the monitoring information to be displayed on the drone monitoring screen. Therefore, it is possible to prevent human error caused by the operator OPm in a case where the operator OPm monitors the plurality of the drones Dn during the same period.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above embodiment, instead of the management server MS, the operator terminal Tm (control unit 24), in accordance with the monitoring application, may identify the drone status of each of the plurality of drones Dn for which the operator OPm is in charge, identify, based on the identified each drone status, the drone Dn for which the monitoring required timing has arrived, and notify, via the operator terminal Tm, the operator OPm of the monitoring information (including information that prompts the operator OPm to monitor the identified drone Dn) for the identified drone Dn. In this case, the monitoring priority master table described above may be stored in the storage unit 23 of the operator terminal Tm. In this case, the operator terminal Tm may execute the monitoring information display processing illustrated in FIG. 13 while acquiring necessary information from the management server MS as needed.

<Note>

[1] An information processing device according to the present disclosure includes: a first identification unit configured to identify a status of each of a plurality of unmanned aerial vehicles for which the operator is in charge; a second identification unit configured to identify, based on the status of each of the plurality of the unmanned aerial vehicles, the unmanned aerial vehicle for which a monitoring required timing has arrived among the plurality of the unmanned aerial vehicles, the monitoring required timing being a timing required for operator to monitor the unmanned aerial vehicle; and a processing unit configured to notify the operator, via a terminal used by the operator, of monitoring information for the unmanned aerial vehicle identified by the second identification unit, the monitoring information including information that prompts the operator to monitor the unmanned aerial vehicle. This makes it possible to prevent human error caused by the operator in a case where the operator monitors the plurality of unmanned aerial vehicles during the same period.

[2] The information processing device described in [1] above, further includes a first determination unit configured to determine whether the monitoring information for the unmanned aerial vehicle identified by the second identification unit is displayed on a screen of the terminal, wherein the processing unit is configured to display, on the screen, the monitoring information for the unmanned aerial vehicle identified by the second identification unit in a case where it is determined, by the first determination unit, that the monitoring information is not displayed on the screen. This makes it possible to reduce a system load.

[3] The information processing device described in [1] or [2] above, further includes: an acquisition unit configured to acquire, based on the status of each of the plurality of the unmanned aerial vehicles, a monitoring priority of each of the plurality of the unmanned aerial vehicles in a case where the plurality of the unmanned aerial vehicles are identified by the second identification unit; and a third identification unit configured to identify, by comparing the respective monitoring priorities acquired by the acquisition unit, the unmanned aerial vehicle with the highest monitoring priority from among the plurality of the unmanned aerial vehicles identified by the second identification unit, wherein the processing unit is configured to display, on a screen of the terminal, the monitoring information for the unmanned aerial vehicle identified by the third identification unit. This makes it possible to more accurately prevent human error caused by the operator, even if the plurality of the monitoring required timings overlap.

[4] In the information processing device described in [3] above, wherein the processing unit is configured to display a portion of the monitoring information for the unmanned aerial vehicle that has not been identified among the plurality of the unmanned aerial vehicles, at a position that does not interfere with the display of the monitoring information for the unmanned aerial vehicle identified by the third identification unit on the screen. This makes it possible to continuously indicate, to the operator, the portion of the monitoring information for the unmanned aerial vehicle that was not identified as the display target of the monitoring information.

[5] The information processing device described in any one of [1] to [4] above, further includes: a second determination unit configured to determine whether the monitoring information for a first unmanned aerial vehicle other than a second unmanned aerial vehicle identified by the second identification unit is displayed on the screen of the terminal, the first unmanned aerial vehicle being during the monitoring required timing; an acquisition unit configured to acquire a first monitoring priority of the first unmanned aerial vehicle based on the status of the first unmanned aerial vehicle and a second monitoring priority of the second unmanned aerial vehicle based on the status of the second unmanned aerial vehicle; and a third determination unit configured to determine, by comparing the first monitoring priority with the second monitoring priority, whether the second monitoring priority is higher than the first monitoring priority in a case where it is determined, by the second determination unit, that the monitoring information for the first unmanned aerial vehicle is displayed on the screen, wherein the processing unit is configured to switch from displaying the monitoring information for the first unmanned aerial vehicle to displaying the monitoring information for the second unmanned aerial vehicle in a case where it is determined, by the third determination unit, that the second monitoring priority is higher than the first monitoring priority. This makes it possible to more accurately prevent human error caused by the operator, even if the plurality of the monitoring required timings overlap.

[6] In the information processing device described in [5] above, wherein the processing unit is configured to display a portion of the monitoring information for the first unmanned aerial vehicle at a position that does not interfere with the display of the monitoring information for the second unmanned aerial vehicle on the screen, in addition to switching from displaying the monitoring information for the first unmanned aerial vehicle to displaying the monitoring information for the second unmanned aerial vehicle. This makes it possible to continuously indicate, to the operator, the portion of the monitoring information for the unmanned aerial vehicle that was not identified as the display target of the monitoring information.

[7] The information processing device described in any one of [1] to [6] above, further includes: a fourth determination unit configured to determine whether the monitoring required timing of a first unmanned aerial vehicle for which the monitoring information is currently displayed on a screen of the terminal, has ended; and a fifth determination unit configured to determine whether there is a second unmanned aerial vehicle other than the first unmanned aerial vehicle among the plurality of the unmanned aerial vehicles, the second unmanned aerial vehicle being during the monitoring required timing, in a case where it is determined, by the fourth determination unit, that the monitoring required timing of the first unmanned aerial vehicle has ended, wherein the processing unit is configured to switch from displaying the monitoring information for the first unmanned aerial vehicle to displaying the monitoring information for the second unmanned aerial vehicle in a case where it is determined, by the fifth determination unit, that there is the second unmanned aerial vehicle. This makes it possible to quickly display, in response to the end of the monitoring required timing for the first unmanned aerial vehicle, the monitoring information for the second unmanned aerial vehicle that is still during the monitoring required timing.

[8] The information processing device described in [7] above, further includes: an acquisition unit configured to acquire, based on the status of each of a plurality of the second unmanned aerial vehicles, a monitoring priority of each of the plurality of the second unmanned aerial vehicles in a case where it is determined, by the fifth determination unit, that there are the plurality of the second unmanned aerial vehicle; and a third identification unit configured to identify, by comparing the respective monitoring priorities acquired by the acquisition unit, the second unmanned aerial vehicle with the highest monitoring priority from among the plurality of the second unmanned aerial vehicles, wherein the processing unit is configured to switch from displaying the monitoring information for the first unmanned aerial vehicle to displaying the monitoring information for the second unmanned aerial vehicle with the highest monitoring priority, which is identified by the third identification unit. This makes it possible to quickly display, in response to the end of the monitoring required timing for the first unmanned aerial vehicle, the monitoring information for the second unmanned aerial vehicle that should be most monitored among the plurality of the second unmanned aerial vehicles that are still during the monitoring required timing.

[9] The information processing device described in any one of [1] to [8] above, further includes a detection unit configured to detect any abnormality of the unmanned aerial vehicle, wherein in a state where the monitoring information for a first unmanned aerial vehicle identified by the second identification unit is displayed on a screen of the terminal, the processing unit is configured to switch, in response to detecting of any abnormality of a second unmanned aerial vehicle other than the first unmanned aerial vehicle among the plurality of the unmanned aerial vehicles, from displaying the monitoring information for the first unmanned aerial vehicle to displaying the monitoring information for the second unmanned aerial vehicle. This makes it possible to quickly display, with the highest priority in response to the occurrence of the abnormality of the unmanned aerial vehicle, the monitoring information for the unmanned aerial vehicle in which the abnormality has been detected.

[10] In the information processing device described in any one of [5] to [9] above, wherein the processing unit is configured to notify the operator of information indicating that displaying of the monitoring information for the unmanned aerial vehicle is switched, in response to switching of displaying the monitoring information for the unmanned aerial vehicle. This allows the operator to quickly grasp that the display of the monitoring information for the unmanned aerial vehicle has been switched.

[11] In the information processing device described in any one of [1] to [10] above, wherein the monitoring information includes at least one of vehicle information acquired by the unmanned aerial vehicle and base information acquired by an instrument at a base where the unmanned aerial vehicle is allowed to take off or land.

[12] In the information processing device described in [11] above, wherein the vehicle information includes a first image captured by a camera provided with the unmanned aerial vehicle, and the base information includes a second image captured by a camera provided with the instrument. This makes it possible for the operator to grasp the appearance of the unmanned aerial vehicle or its surroundings at a glance.

[13] In the information processing device described in [12] above, wherein the processing unit is configured to display, based on the status of the unmanned aerial vehicle, at least one of the first image and the second image. This makes it possible to indicate, to the operator, a more suitable image according to the status of the unmanned aerial vehicle even after switching the display.

[14] In the information processing device described in [9] above, wherein the vehicle information includes a first image captured by a camera provided with the unmanned aerial vehicle, the base information includes a second image captured by a camera provided with an instrument at a base where the unmanned aerial vehicle is allowed to take off or land, and the detection unit is configured to detect the abnormality of the unmanned aerial vehicle by analyzing at least one of the first image and the second image. This makes it possible to quickly detect the abnormality of the unmanned aerial vehicle.

[15] In the information processing device described in any one of [2] to [14] above, wherein the processing unit is configured to highlight a portion at which the operator is requested to gaze in the monitoring information on the basis of the status of the unmanned aerial vehicle identified by the second identification unit. This makes it possible to more accurately prevent human error caused by the operator.

[16] In the information processing device described in [4] or [6] above, wherein the monitoring information includes at least one of a first image captured by a camera provided with the unmanned aerial vehicle and a second image captured by a camera provided with an instrument at a base where the unmanned aerial vehicle is allowed to take off or land, and the portion of the monitoring information is at least one of the first image and the second image. This makes it possible to continuously indicate, to the operator, at least one of the images regarding the unmanned aerial vehicle that was not identified as the display target of the monitoring information.

[17] In the information processing device described in [16] above, wherein the processing unit is configured to select, as the portion of the monitoring information, any one of the first image and the second image on the basis of the status of the unmanned aerial vehicle identified by the second identification unit. This makes it possible to indicate, to the operator, a more suitable image according to the status of the unmanned aerial vehicle even after switching the display.

[18] An information display method executed by one or more computers, according to the present disclosure, includes: identifying a status of each of a plurality of unmanned aerial vehicles for which the operator is in charge; identifying, based on the status of each of the plurality of the unmanned aerial vehicles, the unmanned aerial vehicle for which a monitoring required timing has arrived among the plurality of the unmanned aerial vehicles, the monitoring required timing being a timing required for operator to monitor the unmanned aerial vehicle; and notifying the operator, via a terminal used by the operator, of monitoring information for the identified unmanned aerial vehicle, the monitoring information including information that prompts the operator to monitor the unmanned aerial vehicle.

[19] A program according to the present disclosure, is configured to cause a computer to: acquire, from a predetermined server, a status of each of a plurality of unmanned aerial vehicles for which the operator is in charge; identify, based on the status of each of the plurality of the unmanned aerial vehicles, the unmanned aerial vehicle for which a monitoring required timing has arrived among the plurality of the unmanned aerial vehicles, the monitoring required timing being a timing required for operator to monitor the unmanned aerial vehicle; and notify the operator, via a terminal used by the operator, of monitoring information for the identified unmanned aerial vehicle, the monitoring information including information that prompts the operator to monitor the unmanned aerial vehicle.

REFERENCE SIGNS LIST

11 Power supply unit
12 Drive unit
13 Positioning unit
14 Communication unit
15 Sensor unit
16 Storage unit
17 Control unit
21 Operation/display unit
22 Communication unit
23 Storage unit
24 Control unit
31 Communication unit
32 Storage unit
33 Control unit
331 Status identification unit
332 Monitoring required drone identification unit
333 Monitoring information display control unit

334 Monitoring information display determination unit
335 Priority acquisition unit
336 Priority determination unit
337 Monitoring required timing end determination unit
338 Monitoring required drone determination unit
339 Abnormality detection unit
Dn Drone
Tm Operator terminal
MS Management server
Em Base instrument
S Remote monitoring system

What is claimed is:

1. An information processing device comprising:
at least one memory configured to store program code; and
at least one processor configured to access the program code and operate as instructed by the program code, the program code including:
first identification code configured to cause the at least one processor to identify a status of each of a plurality of unmanned aerial vehicles for which an operator is in charge;
second identification code configured to cause the at least one processor to identify, based on the status of each of the plurality of the unmanned aerial vehicles, the unmanned aerial vehicle for which a monitoring required timing has arrived among the plurality of the unmanned aerial vehicles, the monitoring required timing being a predefined period of operation having a predefined beginning and a predefined ending, the predefined period of operation being associated with a status of the unmanned aerial vehicle and required for the operator to monitor the unmanned aerial vehicle, the status including at least one of an arrival at a base, a take-off, and an arrival at a destination; and
processing code configured to cause the at least one processor to notify the operator, via a terminal used by the operator, of monitoring information for the identified unmanned aerial vehicle, the monitoring information including information that prompts the operator to monitor the identified unmanned aerial vehicle.

2. An information processing device according to claim 1, the program code further including first determination code configured to cause the at least one processor to determine whether the monitoring information for the identified unmanned aerial vehicle is displayed on a screen of the terminal, wherein the processing code is configured to cause the at least one processor to display, on the screen, the monitoring information for the identified unmanned aerial vehicle in a case where it is determined that the monitoring information is not displayed on the screen.

3. An information processing device according to claim 1, the program code further including:
acquisition code configured to cause the at least one processor to acquire, based on the status of each of the plurality of the unmanned aerial vehicles, a monitoring priority of each of the plurality of the unmanned aerial vehicles in a case where a plurality of the unmanned aerial vehicles are identified as unmanned aerial vehicles for which the monitoring required timing has arrived; and
third identification code configured to cause the at least one processor to identify, by comparing the acquired respective monitoring priorities, the unmanned aerial vehicle with the highest monitoring priority from among the plurality of the identified unmanned aerial vehicles,
wherein the processing code is configured to cause the at least one processor to display, on a screen of the terminal, the monitoring information for the identified unmanned aerial vehicle.

4. An information processing device according to claim 3, wherein the processing code is configured to cause the at least one processor to display a portion of the monitoring information for the unmanned aerial vehicle that has not been identified as having the highest monitoring priority among the plurality of the identified unmanned aerial vehicles, at a position that does not interfere with the display of the monitoring information for the identified unmanned aerial vehicle on the screen.

5. An information processing device according to claim 1, the program code further including:
second determination code configured to cause the at least one processor to determine whether the monitoring information for a first unmanned aerial vehicle other than a second unmanned aerial vehicle identified by the second identification code is displayed on the screen of the terminal, the first and second unmanned aerial vehicles being part of the plurality of unmanned aerial vehicles, the first unmanned aerial vehicle being an unmanned aerial vehicle for which the monitoring required timing has not ended;
acquisition code configured to cause the at least one processor to acquire a first monitoring priority of the first unmanned aerial vehicle based on the status of the first unmanned aerial vehicle and a second monitoring priority of the second unmanned aerial vehicle based on the status of the second unmanned aerial vehicle; and
third determination code configured to cause the at least one processor to determine, by comparing the first monitoring priority with the second monitoring priority, whether the second monitoring priority is higher than the first monitoring priority in a case where it is determined that the monitoring information for the first unmanned aerial vehicle is displayed on the screen,
wherein the processing code is configured to cause the at least one processor to switch from displaying the monitoring information for the first unmanned aerial vehicle to displaying the monitoring information for the second unmanned aerial vehicle in a case where it is determined that the second monitoring priority is higher than the first monitoring priority.

6. An information processing device according to claim 5, wherein the processing code is configured to cause the at least one processor to display a portion of the monitoring information for the first unmanned aerial vehicle at a position that does not interfere with the display of the monitoring information for the second unmanned aerial vehicle on the screen, in addition to switching from displaying the monitoring information for the first unmanned aerial vehicle to displaying the monitoring information for the second unmanned aerial vehicle.

7. An information processing device according to claim 1, the program code further including:
fourth determination code configured to cause the at least one processor to determine whether the monitoring required timing of a first unmanned aerial vehicle for which the monitoring information is currently displayed on a screen of the terminal, has ended; and
fifth determination code configured to cause the at least one processor to determine whether there is a second unmanned aerial vehicle other than the first unmanned aerial vehicle among the plurality of the unmanned aerial vehicles, the second unmanned aerial vehicle being an unmanned aerial vehicle for which the monitoring required timing has not ended, in a case where it is determined that the monitoring required timing of the first unmanned aerial vehicle has ended, wherein the processing code is configured to cause the at least one processor to switch from displaying the monitoring information for the first unmanned aerial vehicle to displaying the monitoring information for the second unmanned aerial vehicle in a case where it is determined that there is the second unmanned aerial vehicle.

8. An information processing device according to claim 7, the program code further including:

acquisition code configured to cause the at least one processor to acquire, based on the status of each of a plurality of the second unmanned aerial vehicles, a monitoring priority of each of the plurality of the second unmanned aerial vehicles in a case where it is determined that there are a plurality of the second unmanned aerial vehicles; and third identification code configured to cause the at least one processor to identify, by comparing the acquired respective monitoring priorities, the second unmanned aerial vehicle with the highest monitoring priority from among the plurality of the second unmanned aerial vehicles, wherein the processing code is configured to cause the at least one processor to switch from displaying the monitoring information for the first unmanned aerial vehicle to displaying the monitoring information for the second unmanned aerial vehicle with the highest monitoring priority.

9. An information processing device according to claim 1, the program code further including detection code configured to cause the at least one processor to detect any abnormality of the unmanned aerial vehicle, wherein in a state where the monitoring information for a first unmanned aerial vehicle identified by the second identification code is displayed on a screen of the terminal, the processing code is configured to cause the at least one processor to switch, in response to detecting of any abnormality of a second unmanned aerial vehicle other than the first unmanned aerial vehicle among the plurality of the unmanned aerial vehicles, from displaying the monitoring information for the first unmanned aerial vehicle to displaying the monitoring information for the second unmanned aerial vehicle.

10. An information processing device according to claim 5, wherein the processing code is configured to cause the at least one processor to notify the operator of information indicating that displaying of the monitoring information for the unmanned aerial vehicle is switched, in response to switching of displaying the monitoring information for the unmanned aerial vehicle.

11. An information processing device according to claim 1, wherein the monitoring information includes at least one of vehicle information acquired by the unmanned aerial vehicle and base information acquired by an instrument at a base where the unmanned aerial vehicle is allowed to take off or land.

12. An information processing device according to claim 11, wherein the vehicle information includes a first image captured by a camera provided with the unmanned aerial vehicle, and the base information includes a second image captured by a camera provided with the instrument.

13. An information processing device according to claim 12, wherein the processing code is configured to cause the at least one processor to display, based on the status of the unmanned aerial vehicle, at least one of the first image and the second image.

14. An information processing device according to claim 11, the program code further including detection code configured to cause the at least one processor to detect any abnormality of the unmanned aerial vehicle, wherein the vehicle information includes a first image captured by a camera provided with the unmanned aerial vehicle, the base information includes a second image captured by a camera provided with an instrument at a base where the unmanned aerial vehicle is allowed to take off or land, and the detection code is configured to cause the at least one processor to detect the abnormality of the unmanned aerial vehicle by analyzing at least one of the first image and the second image.

15. An information processing device according to claim 2, wherein the processing code is configured to cause the at least one processor to highlight a portion at which the operator is requested to gaze in the monitoring information on the basis of the status of the identified unmanned aerial vehicle.

16. An information processing device according to claim 4, wherein the monitoring information includes at least one of a first image captured by a camera provided with the unmanned aerial vehicle and a second image captured by a camera provided with an instrument at a base where the unmanned aerial vehicle is allowed to take off or land, and the portion of the monitoring information is at least one of the first image and the second image.

17. An information processing device according to claim 16, wherein the processing code is configured to cause the at least one processor to select, as the portion of the monitoring information, any one of the first image and the second image on the basis of the status of the identified unmanned aerial vehicle.

18. An information display method executed by one or more computers comprising:

identifying a status of each of a plurality of unmanned aerial vehicles for which an operator is in charge;

identifying, based on the status of each of the plurality of the unmanned aerial vehicles, the unmanned aerial vehicle for which a monitoring required timing has arrived among the plurality of the unmanned aerial vehicles, the monitoring required timing being a predefined period of operation having a predefined beginning and a predefined ending, the predefined period of operation being associated with a status of the unmanned aerial vehicle and required for the operator to monitor the unmanned aerial vehicle, the status including at least one of an arrival at a base, a take-off, and an arrival at a destination; and notifying the operator, via a terminal used by the operator, of monitoring information for the identified unmanned aerial vehicle, the monitoring information including information that prompts the operator to monitor the unmanned aerial vehicle.

19. A non-transitory computer readable memory having stored thereon a program configured to cause a computer to:

acquire, from a predetermined server, a status of each of a plurality of unmanned aerial vehicles for which an operator is in charge;

identify, based on the status of each of the plurality of the unmanned aerial vehicles, the unmanned aerial vehicle for which a monitoring required timing has arrived among the plurality of the unmanned aerial vehicles, the monitoring required timing being a predefined period of operation having a predefined beginning and a predefined ending, the predefined period of operation being associated with a status of the unmanned aerial vehicle and required for the operator to monitor the unmanned aerial vehicle, the status including at least one of an arrival at a base, a take-off, and an arrival at a destination; and notify the operator, via a terminal used by the operator, of monitoring information for the identified unmanned aerial vehicle, the monitoring information including information that prompts the operator to monitor the unmanned aerial vehicle.

* * * * *